United States Patent
Aissi et al.

(10) Patent No.: US 10,796,009 B2
(45) Date of Patent: *Oct. 6, 2020

(54) SECURITY ENGINE FOR A SECURE OPERATING ENVIRONMENT

(71) Applicant: Visa International Service Association, San Francisco, CA (US)

(72) Inventors: Selim Aissi, Menlo Park, CA (US); Taeho Kgil, Foster City, CA (US); Gyan Prakash, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,829

(22) Filed: Feb. 7, 2019

(65) Prior Publication Data

US 2019/0188394 A1    Jun. 20, 2019

Related U.S. Application Data

(63) Continuation of application No. 15/828,042, filed on Nov. 30, 2017, now Pat. No. 10,255,444, which is a
(Continued)

(51) Int. Cl.
*G06F 21/00* (2013.01)
*G06F 21/60* (2013.01)
(Continued)

(52) U.S. Cl.
CPC .......... *G06F 21/604* (2013.01); *G06F 21/53* (2013.01); *G06F 21/57* (2013.01); *G06F 21/6218* (2013.01); *G06F 2221/2113* (2013.01)

(58) Field of Classification Search
CPC .............. G06F 21/604; G06F 21/6218; G06F 2221/2113; G06F 21/53; G06F 21/57; G06F 2221/2141; G06F 21/00; G06F 21/31

See application file for complete search history.

(56) References Cited

U.S. PATENT DOCUMENTS 7,313,825 B2    12/2007 Redlich et al.
7,694,328 B2    4/2010 Joshi et al.
(Continued)

FOREIGN PATENT DOCUMENTS

CN    102184372 A    9/2011
EP    2680179 A1    1/2014
(Continued)

OTHER PUBLICATIONS

"Keychain Services Programming Guide," Jun. 11, 2013, Apple Inc., 53 pages.
(Continued)

*Primary Examiner* — Ghazal B Shehni
(74) *Attorney, Agent, or Firm* — Kilpatrick Townsend & Stockton LLP

(57) ABSTRACT

The presenting invention relates to techniques for implementing a secure operating environment for the execution of applications on a computing devices (e.g., a mobile phone). In The secure operating environment may provide a trusted environment with dedicated computing resources to manage security and integrity of processing and data for the applications. The applications may be provided with a variety of security services and/or functions to meet different levels of security demanded by an application. The secure operating environment may include a security engine that enumerates and/or determines the security capabilities of the secure operating environment and the computing device, e.g., the hardware, the software, and/or the firmware of the computing device. The security engine may provide security services desired by applications by choosing from the security capabilities that are supported by the secure operating environment and the computing device.

19 Claims, 13 Drawing Sheets

Related U.S. Application Data continuation of application No. 15/220,290, filed on Jul. 26, 2016, now Pat. No. 9,870,477, which is a continuation of application No. 14/269,999, filed on May 5, 2014, now Pat. No. 9,424,421.

(60) Provisional application No. 61/819,305, filed on May 3, 2013, provisional application No. 61/840,394, filed on Jun. 27, 2013, provisional application No. 61/840,402, filed on Jun. 27, 2013.

(51) Int. Cl.
*G06F 21/57* (2013.01)
*G06F 21/53* (2013.01)
*G06F 21/62* (2013.01)

(56) References Cited

U.S. PATENT DOCUMENTS

| | | | |
|---|---|---|---|
| 8,364,959 | B2 | 1/2013 | Bhanoo et al. |
| 2004/0123132 | A1 | 6/2004 | Montgomery et al. |
| 2007/0266422 | A1 | 11/2007 | Germano et al. |
| 2010/0058016 | A1 | 3/2010 | Nikara et al. |
| 2010/0115291 | A1 | 5/2010 | Buer |
| 2011/0191465 | A1 | 8/2011 | Hofstaedter et al. |
| 2012/0084864 | A1 | 4/2012 | Mahaffey et al. |
| 2012/0272206 | A1 | 10/2012 | Sengupta et al. |
| 2013/0091543 | A1* | 4/2013 | Wade ............... G06F 21/54 726/1 |
| 2013/0145463 | A1 | 6/2013 | Ghosh et al. |
| 2013/0185764 | A1 | 7/2013 | Krstic et al. |
| 2013/0219176 | A1 | 8/2013 | Akella et al. |
| 2013/0232336 | A1 | 9/2013 | Cheung et al. |
| 2013/0291053 | A1 | 10/2013 | Buer et al. |
| 2013/0297662 | A1 | 11/2013 | Sharma |
| 2013/0298138 | A1 | 11/2013 | Avadhanam |
| 2013/0298185 | A1 | 11/2013 | Koneru et al. |
| 2014/0006347 | A1 | 1/2014 | Qureshi et al. |
| 2014/0032733 | A1 | 1/2014 | Barton et al. |
| 2014/0041026 | A1 | 2/2014 | Scott |
| 2014/0150081 | A1* | 5/2014 | Cooley ............... H04L 63/1433 726/11 |

FOREIGN PATENT DOCUMENTS

| | | |
|---|---|---|
| WO | 2009042617 A1 | 4/2009 |
| WO | 2010023355 A1 | 3/2010 |
| WO | 2013074041 A1 | 5/2013 |
| WO | 2013103959 A2 | 7/2013 |
| WO | 2013151454 A1 | 10/2013 |

OTHER PUBLICATIONS

"Memory Usage Performance Guidelines," Apr. 23, 2013, Apple Inc., 47 pages.

IOS App Programming Guide, Apr. 23, 2013, Apple Inc., 149 pages.

Non-Final Office Action, U.S. Appl. No. 14/269,999 dated Sep. 18, 2015, 12 pages.

Notice of Allowance, U.S. Appl. No. 14/269,999, dated Apr. 13, 2016, 9 pages.

Non-Final Office Action, U.S. Appl. No. 15/220,290 dated Dec. 30, 2016, 10 pages.

\* cited by examiner

FIG. 5

| Types of Security Capabilities 520 | Secure Operating Environment Security Capabilities 522 | Host Operating Environment Security Capabilities 524 |
|---|---|---|
| Memory Management (504) | - Allocation / De-allocation of application memory<br>- Memory isolation<br>- Scrubbing<br>- Fragmentation management<br>- Memory recovery<br>- Read / Write<br>- Initialization<br>- Rounding size / ceiling size management | - Device Memory (e.g., internal storage)<br>- Secure Element (e.g., storage card) |
| Data Protection (506) | - Data encryption (e.g. AES, 3DES, DES)<br>- Hashing<br>- Random Number Generation (RNG)<br>- Security Information Management<br>  - Rollback / Replay<br>  - Time-bound (mutate/revoke/update)<br>- Cryptographic codes | - Data Encryption (e.g., AES)<br>- Keychain management |
| Communication Security (508) | - Secure Sockets Layer (SSL)<br>- Transport Layer Security (TLS)<br>- Virtual Private Network (VPN) (e.g., IPsec VPN) | - Secure Sockets Layer (SSL) |
| Identity Management (510) | - Login and Password management<br>- Bank account management | - None |
| Authentication (512) | - authenticate communications and commerce<br>- local and remote authentication (e.g., authentication service providers) | - Authentication of user access |
| Access Control (514) | - Advanced Access Control (e.g., fine grain access control) | - None |
| Privilege Escalation Detection (516) | - Jail-breaking Detection<br>- Root Detection | - None |

| Security Policy 720 | Security Profile 722 | Protected Criteria 724 | Modification Schedule 726 | Security Information Management 728 | Memory Management 730 |
|---|---|---|---|---|---|
| Trusted 702 | Highly Sensitive | Financial Account Information; Keys/Tokens; Personal Information | Data Protection: Daily; Memory Management: Hourly | Default: Mutate; Unauthorized Access: Revoke, Mutate; Authorized Access: Mutate | Allocation / De-allocation of application memory; Scrubbing; Fragmentation management |
| Private (Secure) 704 | Sensitive | Online Account Access (e.g., Email ID and password); Medical Information (e.g., medical ID) | Data Protection: Weekly; Memory Management: Daily | Default: Mutate; Unauthorized Access: Mutate; Authorized Access: Mutate | Allocation / De-allocation of application memory |
| Semi-Private 706 | Important | User specific media | Data Protection: Monthly; Memory Management: Monthly | Unauthorized Access: Revoke; Default: Mutate | Allocation / De-allocation of application memory |
| Untrusted 708 | Not Sensitive | News data; Public media | Data Protection – None; Memory Management: None | None | Memory Security: Secure Memory |

← Incremental Security based on Sensitivity of Data  740

SECURITY ENGINE FOR A SECURE OPERATING ENVIRONMENT

CROSS-REFERENCES TO RELATED APPLICATIONS

This application is a continuation application of U.S. patent application Ser. No. 15/828,042, filed on Nov. 30, 2017, which is a continuation of U.S. patent application Ser. No. 15/220,290, filed Jul. 26, 2016, which is a continuation of U.S. patent application Ser. No. 14/269,999, filed on May 5, 2014, which is a non-provisional application which claims priority and benefit from each of the following patent applications:

1) U.S. Provisional Application No. 61/819,305, filed May 3, 2013;
(2) U.S. Provisional Application No. 61/840,394, filed Jun. 27, 2013; and
(3) U.S. Provisional Application No. 61/840,402, filed Jun. 27, 2013.

The contents of each of the above-identified patent applications are herein incorporated by reference in their entirety for all purposes.

TECHNICAL FIELD

The present disclosure relates to techniques for implementing a security engine in a secure operating environment on a computing device. In particular, the present invention relates to determining security capabilities of a computing device and providing security services based on the available security capabilities.

BACKGROUND

As the computing capabilities of mobile devices become more and more powerful, consumers are increasingly using their mobile devices to access the Internet and to perform more and more complex tasks. For example, mobile devices are being used in an increasing manner to access services and subscriptions through applications running on mobile devices. These applications enable consumers, for example, to conduct payment transactions, access bank accounts, and access subscribed content. To facilitate access to services and subscriptions via mobile devices, consumers are entrusting their mobile devices and the applications running thereon with sensitive data such as Persona Identifiable Information (for example, birth dates, social security numbers, etc.) and Personal Account Information (for example, credit card numbers, account numbers, passwords, etc.). As a result, mobile devices are becoming a popular and attractive target for viruses, malware, and phishing attempts.

With an increase in reliance on applications running on mobile devices to secure access to services and subscriptions, the mobile devices are continuously storing and interacting with sensitive data. The sensitive data can be stored in different areas of the device and can be controlled and managed by multiple applications. Sensitive data may also be channeled to a device through user input, applications, cameras, sensors, interactions with other devices, removable media or any other suitable means. The amount of sensitive data that is stored and managed on the mobile device will continue to increase with the reliance on such devices.

As a way of protecting the sensitive data, mobile devices may use a secure element in the form of a hardware chip to process and access sensitive data. However, the amount of sensitive data that can be protected by a secure element may be hindered by the computing resources and storage capacity of the secure element. Users may install security sensitive applications as more and more security sensitive tasks are being performed. However, the variation of support for security functionality between any two devices is too large for rapid development and secure deployment of security sensitive applications. For example, in a "bring your own device" environment, even within a single corporation many hundreds of variations of hardware, operating systems and security hooks exist.

The significant variations in the operating environments for the various devices can lead to development of applications that use the least common denominator in terms of security features offered based on a combination of hardware and operating system resources in the various operating environments. In many instances, the device itself does not support the security functions desired by the security application, thereby reducing the options available for running the application securely, implementing security algorithms in the application itself or not installing or running the security sensitive application on the device at all.

Embodiments of the present disclosure address these and other problems, individually and collectively.

BRIEF SUMMARY

The presenting invention relates to techniques for implementing a secure operating environment for the execution of applications on a computing devices (e.g., a mobile phone). In The secure operating environment may provide a trusted environment with dedicated computing resources to manage security and integrity of processing and data for the applications. The applications may be provided with a variety of security services and/or functions to meet different levels of security demanded by an application.

In some embodiments, the secure operating environment may include a security engine that enumerates and/or determines the security capabilities of the secure operating environment and the computing device, e.g., the hardware, the software, and/or the firmware of the computing device. The security engine may provide security services desired by applications by choosing from the security capabilities that are supported by the secure operating environment and the computing device. The security capabilities may be chosen based on consideration of criteria including sensitivity of data processed for an application, a type of application, a type of operations performed by the application, other criteria related to the security of the application, or a combination thereof.

In some embodiments, the security operating environment may provide a callable interface that enables an application executing in the secure operating environment to request security services from different categories of security services. The categories of security services may include memory management data protection, communication security, identity management, authentication, access control, and privilege escalation detection. The security services may be provided based on the security capabilities of the computing device. The security operating environment may augment the security capabilities of the computing device with additional security capabilities. By providing security services in addition to those discovered on the computing device, the security operating environment can offer sensitive applications the ability to run securely on a wide variety of devices (e.g., feature phone devices and smart phone devices), compensating for the deficiencies in the capabilities of the devices.

In some embodiments, the security operating environment may provide a robust and certifiable secure storage solution for storing security information (e.g., certificates, keys, password, or sensitive data). The secure storage solution may store keys, certificates, sensitive data, and/or the like, that are used to manage security for the secure operating environment and the applications executing in the secure operating environment. The secure storage solution may be implemented based on information (e.g., security keys and encrypted information) stored outside of the computing device. The security information may be generated based on information (e.g., seed data or encrypted information) stored at a remote server (e.g., a backend security server). The secure storage solution may be time-bound, such that the secure storage solution can be mutated, revoked, and/or updated to prevent unauthorized entities from accessing to the security information. By dynamically changing the secure storage solution periodically in a time-bound manner, unauthorized entities may be prevented from gaining access the contents of the secure storage solution. Cryptographic codes (e.g., cryptograms) and/or reliability codes may be used to perform the changes according to a time-bound schedule. The secure storage solution may be maintained by the secure operating environment to remain under the control of the security operating environment.

In some embodiments, the secure operating environment may provide memory management services that can provide end to end lifecycle management of memory for the secure operating environment. The memory management services may be used to support the secure storage solution. The memory management services can perform a variety of services to ensure secure memory management for the secure operating environment. The memory management services can perform, among other functions, allocation and de-allocation of memory, memory isolation, scrubbing, memory fragmentation management, memory recovery, memory initialization, and memory rounding size and ceiling size management. The memory management services may manage the memory of the secure operating environment according to different security policies. In some embodiments, the memory management services may perform any one of the memory management functions with respect to the memory in response to detecting an event related to the memory. For example, an event can include a change in state of the memory, suggestive of an unauthorized attempt to access the memory from outside the secure operating environment.

Some embodiments of the present invention are directed to methods that can be performed by a computing device (e.g., a mobile phone). The computing device can include one or more processors. The one or more processors can be coupled to memory devices in the computing device. One or more first memory devices may be configured to be used by the one or more processors to execute a secure operating environment. One or more second memory devices may include instructions which when executed on the one or more processors, cause the one or more processor to execute a host operating environment and to execute the secure operating environment. Upon execution of the secure operating environment, the secure operating environment may perform a method. One such method may include executing an application in the secure operating environment. The method may include receiving, from the application, a request for a security service. The method may include determining a security capability of the mobile computing device to provide the security service. The security capability of the mobile device may include a security capability provided by the host operating environment. The method may include determining a security capability of the secure operating environment to provide the security service. The method may include selecting a security capability to provide the security service. The security capability may be selected from one or both of the security capability of the mobile computing device and the security capability of the secure operating environment. The method may include providing, to the application, the security service based on the selected security capability.

In another embodiment the computing device described above, the secure operating may perform a method that includes executing an application in the secure operating environment. The method may include receiving, from the application, a request for a security service to manage security of memory for the application. The method may include determining a security policy for managing security of the memory for the application. The method may include, based on the security policy, selecting an action to perform for managing security of the memory and performing the selected action.

The foregoing has outlined rather broadly the features and technical advantages of examples according to the disclosure in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

FIG. 5 shows information about security capabilities of a secure operating environment and a host operating environment of a computing device according to some embodiments of the present invention.

FIG. 7 shows information about security policies implemented for a secure operating environment according to some embodiments of the present invention.

DETAILED DESCRIPTION

Figure 1:
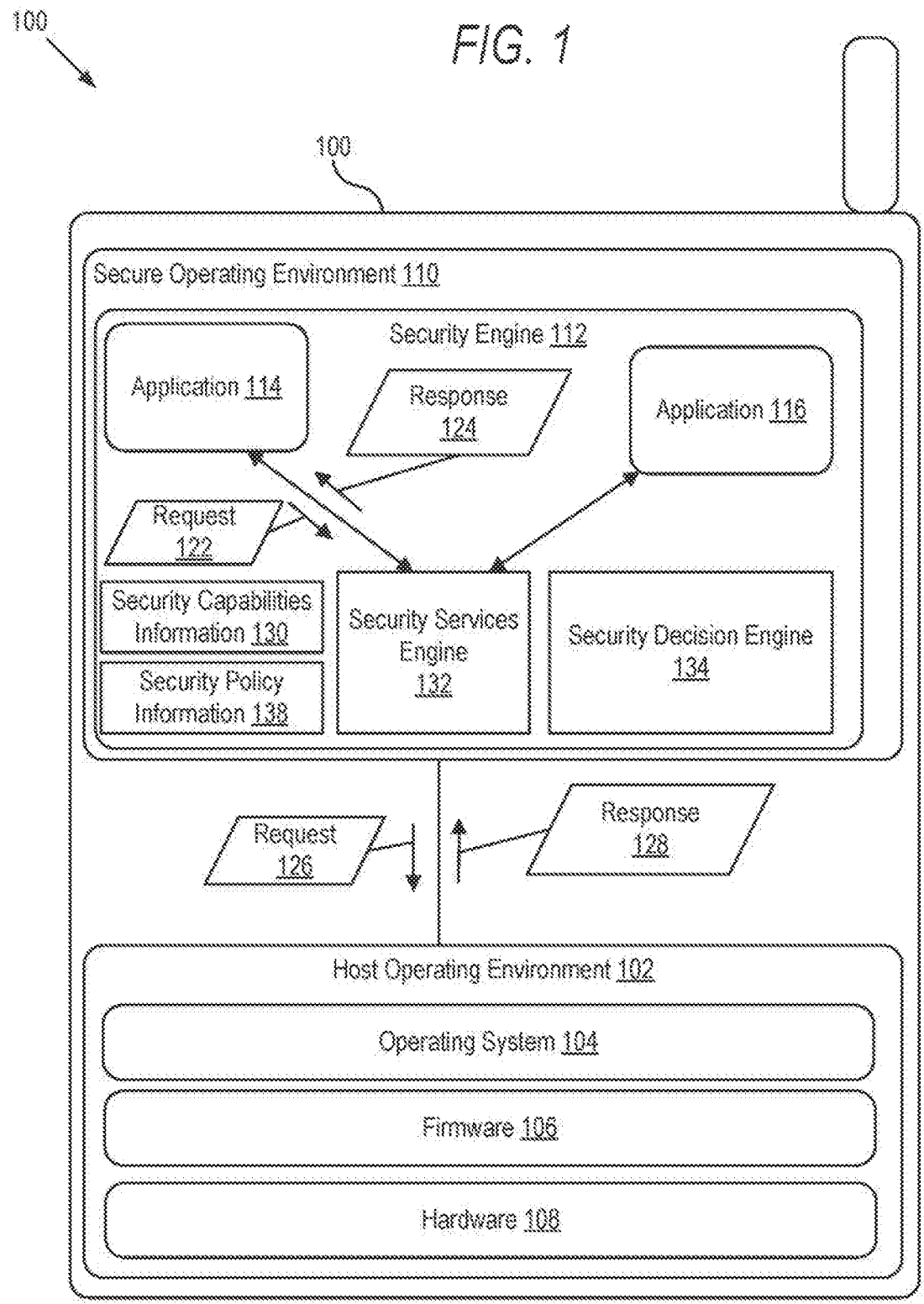
FIG. 1 shows a computing device including a secure operating environment according to some embodiments of the present invention.

In the following description, for the purposes of explanation, specific details are set forth in order to provide a thorough understanding of some embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The presenting invention relates to techniques for implementing a secure operating environment for the execution of applications on a computing devices (e.g., a mobile phone). In The secure operating environment may provide a trusted environment with dedicated computing resources to manage security and integrity of processing and data for the applications. The applications may be provided with a variety of security services and/or functions to meet different levels of security demanded by an application.

In some embodiments, the secure operating environment may include a security engine that enumerates and/or determines the security capabilities of the secure operating environment and the computing device, e.g., the hardware, the software, and/or the firmware of the computing device. The security engine may provide security services desired by applications by choosing from the security capabilities that are supported by the secure operating environment and the computing device. The security capabilities may be chosen based on consideration of criteria including sensitivity of data processed for an application, a type of application, a type of operations performed by the application, other criteria related to the security of the application, or a combination thereof.

In some embodiments, the security operating environment may provide a callable interface that enables an application executing in the secure operating environment to request security services from different categories of security services. The categories of security services may include memory management data protection, communication security, identity management, authentication, access control, and privilege escalation detection. The security services may be provided based on the security capabilities of the computing device. The security operating environment may augment the security capabilities of the computing device with additional security capabilities. By providing security services in addition to those discovered on the computing device, the security operating environment can offer sensitive applications the ability to run securely on a wide variety of devices (e.g., feature phone devices and smart phone devices), compensating for the deficiencies in the capabilities of the devices.

In some embodiments, the security operating environment may provide a robust and certifiable secure storage solution for storing security information (e.g., certificates, keys, password, or sensitive data). The secure storage solution may store keys, certificates, sensitive data, and/or the like, that are used to manage security for the secure operating environment and the applications executing in the secure operating environment. The secure storage solution may be implemented based on information (e.g., security keys and encrypted information) stored outside of the computing device. The security information may be generated based on information (e.g., seed data or encrypted information) stored at a remote server (e.g., a backend security server). The secure storage solution may be time-bound, such that the secure storage solution can be mutated, revoked, and/or updated to prevent unauthorized entities from accessing to the security information. By dynamically changing the secure storage solution periodically in a time-bound manner, unauthorized entities may be prevented from gaining access the contents of the secure storage solution. Cryptographic codes (e.g., cryptograms) and/or reliability codes may be used to perform the changes according to a time-bound schedule. The secure storage solution may be maintained by the secure operating environment to remain under the control of the security operating environment.

In some embodiments, the secure operating environment may provide memory management services that can provide end to end lifecycle management of memory for the secure operating environment. The memory management services may be used to support the secure storage solution. The memory management services can perform a variety of services to ensure secure memory management for the secure operating environment. The memory management services can perform, among other functions, allocation and de-allocation of memory, memory isolation, scrubbing, memory fragmentation management, memory recovery, memory initialization, and memory rounding size and ceiling size management. The memory management services may manage the memory of the secure operating environment according to different security policies. In some embodiments, the memory management services may perform any one of the memory management functions with respect to the memory in response to detecting an event related to the memory. For example, an event can include a change in state of the memory, suggestive of an unauthorized attempt to access the memory from outside the secure operating environment.

Prior to discussing the various embodiments of the present invention, a description of some terms may be helpful for a better understanding of the disclosure.

A "computing device" may include a device that includes electronic components such as one or more processors coupled to one or more computer readable and/or writable memories (e.g., implementing one or more storage devices and/or system memories). A computing device may be used to execute one or more software applications. A computing device may also implement multiple operating environments using hardware, software, firmware, or a combination thereof for running security sensitive applications. Examples of computing devices may include computers, mobile devices, point-of-sale devices, security token devices, etc. Some computing devices such as point-of-sale devices and security token devices are specialized for conducting financial transactions.

A "mobile device" may include any electronic device that may be transported and operated by a user. The mobile device may provide communication capabilities for remote communication with a network. The mobile device may be configured to transmit and receive messages or communications to and from a server computer and display the messages on a display screen on the mobile device. Examples of mobile devices include mobile phones (e.g. cellular phones), PDAs, tablet computers, net books, laptop computers, personal music players, hand-held specialized readers, etc.

A "server" or "server computer" may typically be a powerful computer or cluster of computers. For example, the server computer may be a large mainframe, a minicomputer cluster, or a group of servers functioning as a unity. In one example, the server computer may be a database server coupled to a web server.

A "user" may be an entity, such as, an individual that may be associated with one or more payment accounts, one or more devices. A user may be able to operate a computing device to use an security sensitive application, such as a banking or payment application, executing on the device. Furthermore, through a user interface provided by a device (e.g., a computing device or a mobile device), the user may be capable performing security sensitive functions and services.

"Sensitive data" may include information that may require security protection. For example, sensitive data may be sensitive information associated with a user, such as Personal Identifying Information (PII) (e.g., name, home address, e-mail address, phone number, social security number, etc.), Personal Account Information (PAI) associated with a financial account (e.g., primary account number (PAN), expiration date, verification numbers or codes, etc.), Personal identification Number (PIN), or a username/password associated with other types of non-financial accounts (e.g., email accounts), etc. Sensitive data may also include device information associated with a computing device such as Electronic Serial Number (ESN), Internet Protocol (IP) address, Media Access Control (MAC) address, device identifier, device settings, geo-location information associated with the computing device, etc. Sensitive data may also include user data such as a picture or image taken by a user, an audio recording, a contact of the user, etc. Sensitive data may also include data or information used for cryptographic operations such as a cryptographic algorithms, digital certificates, cryptographic keys, etc., and/or data resulting from a cryptographic operation such as encrypted data. Thus, sensitive data may include information that is stored or programmed onto the computing device, specifically entered into the computer device by the user, and/or information otherwise accessible by the computing device that may be used by the computing device. Sensitive data may also include execution of a code (e.g., software code of an application or operating system, firmware code, etc.). Sensitive data may be associated with other data, for example, by being mapped or linked to other assets, or by being used by the same application. For example, a PAN may be associated with a name on the account and a verification code.

"Security information" may include data or information used for security operations (e.g., cryptographic operations). Examples of security information are digital certificates, cryptographic keys, etc., and/or data, resulting from a cryptographic operation such as encrypted data.

A "security sensitive application" may include any application executing on a device that manages or uses sensitive data associated with the user, such as a payment account.

As used herein, a "security policy" may includes a set of rules that are used for protecting and/or managing access to sensitive data, security services, or a combination thereof. For example, a security policy may determine how sensitive data is stored (e.g., in an encrypted form or in a certain storage area), or determine how sensitive data may be accessed (e.g., authentication of a requesting entity, exchange of cryptographic messages, etc.). The security policy for an application may be tied to sensitivity of data and may be used to determine security services to provide to the application based on the sensitivity of the data.

A "cryptographic measurement" may be generated from a sequence of bits, such as a message or software using well-known one way hash functions, resulting in a cryptographic string. Examples of such cryptographic functions include, but are not limited to SHA-1 (Secure Hash Algorithm-1) and SHA-256 (Secure Hash Algorithm-256). A cryptographic measurement uniquely identifies the sequence of bits using the cryptographic string so that no other cryptographic string may represent the same sequence of bits. The cryptographic measurement of a sequence of bits may be used to authenticate the integrity of the sequence of bits (i.e., the sequence of bits have not been tampered with). For example, a cryptographic measurement of an operating system may be checked against a stored value from a protected location to determine that the operating system has not been modified from its expected state.

A "digital fingerprint" is a value or string representing a summary of the state of the software and hardware components in a device. A digital fingerprint may be generated based on information collected about the individual components in a device, such as attestation values associated with the components.

An "attestation value" is a value or string representing the state of a software or hardware component. An attestation value may be used to indicate the presence, identity, and integrity of a component installed or available on a device.

A "cryptographic operation" may include encryption, decryption, Message Authentication Code generation or verification, hash generation or verification (e.g., SHA-1 (Secure Hash Algorithm-1) and SHA-256 (Secure Hash Algorithm-256), etc.). A cryptographic operation may be used to change a representation of an asset. A cryptographic operation may be performed on data or a sequence of bits resulting in a cryptographic string.

"Authentication" or "authenticating" may be the process of proving or verifying certain information, and/or verifying the identity of the source of that information. Authentication to verify the source of information may be achieved, for example, through the use of digital certificates and/or digital signatures. The digital certificate and/or digital signature may be generated using a private key of a key pair; and may be verified using a public key of the key pair.

"Integrity" may be an indication of the absence of corruption in a software or hardware component. Integrity may be used to indicate that a component may be trusted, is unaltered, and has not been modified by an unauthorized party. Integrity of a component may be determined, for example, by generating a cryptographic measurement of the component, and verifying the cryptographic measurement against a trusted or known good value.

"Virtualization" may be used for providing isolation between different operating environments sharing the same physical resources, and may be one form of secure operating environment. In other words, virtualization provides a logical abstraction of computing resources from physical constraints. One common abstraction is referred to as a virtual machine (VM) which provides the content running in the VM a direct interface to the physical hardware while maintaining the abstraction. Visualization technology allows multiple VMs running on the same physical hardware to operate independently and isolated from each other. One or more VMs on the system may be managed by a Virtualized Machine Monitor, or VMM (also known as hypervisor or host). The VMM is a software or firmware layer component responsible for hosting and managing virtual machines. The VMM manages the system's processor, memory, and allocates other resources for each VM.

An "operating system" (OS) may be a collection of software that manages computer hardware resources and provides common services for applications. The operating system is a vital component of the system software in a computing device. Software applications usually require an operating system to function. The operating system may determine which software application is given access to which resource on the computing device.

A "network stack" may be an implementation of a networking protocol used for communicating between any two devices. In some implementations, the operating system implements one or more network stacks for communicating with a network, wherein the network comprises of one or more computing devices. An example of a networking protocol is the open standards interface (OSI) networking protocol. A network stack may be capable of communicating over a variety of wired and wireless protocols, such as Ethernet, 3GPP, 3GPP2, CDMA, LTE, Bluetooth, NFC, etc.

A "secure communication channel" may be a networking channel between two entities, such as a server computer and mobile device, that may allow the two entities to communicate with each other through a secure channel without evesdropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing a secure operating environment to be transmitted securely between the two entities. Known techniques, such as secure socket layer (SSL) protocols may be used in establishing a secure communication channel.

A "subscriber identity/identification module" (SIM) is an example of an execution environment. The SIM is commonly used to securely store the international mobile subscriber identity (IMSI) and the related key used to identify and authenticate subscribers on mobile device. A SIM circuit is embedded into a removable plastic card. This plastic card is called "SIM card" and may be transferred between different mobile devices. A SIM card is an example of an operating environment, however, other variations of a SIM card, such as a universal integrate circuit card (UICC) may be interchangeably used herein, without departing from the scope of the invention.

A "secure element" may provide a secure environment for securely storing applications, sensitive data, and/or credentials (e.g., financial account numbers). A secure element may provide for secure execution of applications. The secure element may comprise secure memory and an execution environment that is a dynamic environment to securely store application code and data and administer the secure execution of applications. The secure element may comprise computing logic, such as a 8-32 bit CISC/RISC processor, a crypto processor for encrypting, decrypting and signing data packets using security algorithms and/or techniques such as Advance Encryption Standard (AES), Data Encryption Standard (DES), Triple-DES, error-correction code (ECC), a random number generator, ROM, RAM, EEPROM/Flash, a communication interface and a Memory Management unit. The secure element may also provide delimited memory for each application. A secure element may be implemented with a SIM card, a Secure Digital (SD) card, or a hardware security token embedded in a computing device.

"Root of trust" (RoT) are security primitives composed of hardware, firmware and/or software that provide a set of trusted, security-critical functions. A RoT may behave in an particular manner. A RoT may be exposed to a device and it's OS in order to establish a chain of trust for user applications. Mobile applications interacting with services may utilize the security functions provided by the RoT to locally store cryptographic keys, authentication credentials, and other sensitive data. To support device integrity, isolation, and protected storage, devices may implement RoTs such as a RoT for Storage (RTS), a RoT for Verification (RTV), a Root of Trust for Integrity (RTI), a Root of Trust for Reporting (RTR), and a Root of Trust for Measurement (RTM). The RTS may provide a protected repository and a protected interface to store and manage keying material. The RTV may provide a protected engine and interface to verify digital signatures associated with software/firmware and create assertions based on the results. The RTI may provide protected storage, integrity protection, and a protected interface to store and manage assertions. The RTR may provide a protected environment and interface to manage identities and sign assertions. The RTM may provide a measurement used by assertions protected via the RTI and attested to with the RTR.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may interact with applications running on a user device. The payment processing network may include a server computer. The payment processing network may use any suitable wired or wireless network, including the Internet.

An "issuer" may typically refer to a business entity (e.g., a bank) that maintains financial accounts for the user and often issues a payment device, such as a credit or debit card to the user. An "issuer" may also refer to a trusted authority that provides digital certificates used for authentication. A "merchant" is typically an entity that engages in transactions and may sell goods or services. An "acquirer" is typically a business entity (e.g., a commercial bank) that has a business relationship with a particular merchant or other entity. Some entities may perform both issuer and acquirer functions. Some embodiments may encompass such single entity issuer-acquirers. Each of the entities (e.g., merchants and issuers may comprise one or more computer apparatuses to enable communications through the communications network, or to perform one or more of the functions described herein.

FIG. 1 shows a computing device 100 (e.g., a mobile phone) including a secure operating environment 100 according to some embodiments of the present invention. The computing device 100 may implement one or more host environments. A host environment can be a host operating environment 102. The host operating environment 102 can provide an environment for operation of the computer device 100. The host operating environment 102 can provide an execution environment to enable execution of applications and other execution environments. In some embodiments, the host operating environment 102 may be configured to execute and operate applications such as a web browser, proprietary client applications, or the like.

The computing device 100 may enable execution of one or more secure operating environments, such as a secure operating environment 110. The secure operating environment 110 may provide a tightly controlled, secure environment for the execution of applications. The secure operating environment 110 may provide a variety of security services to an application executing the in the secure operating environment 110. The security services may enable the application to perform operations for security sensitive data in a trusted manner. For example, the computing device 100 may be used to perform secure tasks such as secure payment or banking transactions using security sensitive data available to computing device 110. The secure operating environment 110 may be communicatively coupled to the host operating environment 102. Communication between the secure operating environment 110 and the host operating environment 102 is further described below.

The host operating environment 102 may be comprised of software, hardware, firmware, or a combination thereof. For instance, the host operating environment 102 may include an operating system 104, firmware 106, and hardware 108. The hardware 108 may more storage and/or system memories may be implemented using one or more computer accessible mediums (e.g., readable and/or writable storage mediums). The memories may include memory storage devices. The one or more memories may be accessible to the processor(s) and may include instructions stored thereon which, when executed by the processor(s), cause the processor(s) to implement one or more operations disclosed herein. Although the computing device 110 is shown as a mobile device, it should be understood that in other embodiments, the computing device 102 may alternatively be a computer, a point-of-sale device, a security token device, or other types of electronic device suitable for implementing embodiments of the present invention. Some embodiments of the computing device 100 are further described with reference to FIGS. 2-5.

The memory included in the hardware 108 may be configured to be used by the processor(s) in the hardware 108 to execute the secure operating environment 110. In some embodiments, the memory may include instructions for implementing the secure operating environment 110. The memory may be configured to be used by the processor(s) to execute a method according to some embodiments of the present invention. A method may include executing the host operating environment 102 and/or executing the secure operating environment 110. In some embodiments, the memory may be configured to be used by the processor(s) to implement the secure operating environment 110 may be different from the memory configured to be used by the processor(s) to implement to the host operating environment 102. Thus, memory for secure operating environment 110 may be isolated from the host operating environment 102.

The host operating environment 102 may provide an environment for executing applications. The host operating environment 102 may have security capabilities, which can be used by the applications executing the in host operating environment 102. The security capabilities may include, among others, cryptographic functionality/operations, a Root of Trust, and/or trusted input. The hardware 108 may support or provide security capabilities. For example, the hardware 108 may include storage (e.g., memory) for storing security sensitive data and security sensitive applications. In some embodiments, the security capabilities of the computing device 110 may be based on a configuration of the host operating environment 102. For example, the security capabilities may be provide based on capabilities of the hardware 108, the firmware 106, the operating system 104, or a combination thereof. For example, the host operating environment 102 may include a hardware security module (HSM) that provides a secure environment to enable operation (e.g., cryptographic operations) to be performed in hardware isolated from applications. In some embodiments, the security capabilities 128 of the host operating environment 102 may not support security services needed by an application to support a secure environment. In such embodiments, the secure operating environment 110 may provide the application with security services to the application to offer a trusted environment for operation of security sensitive applications. Examples of types of security capabilities of the computing device 100 are described in further detail with reference to FIGS. 2 and 5.

Secure Operating Environment

The secure operating environment 110 may provide a secure execution environment on the computing device for securely executing an application, e.g., the application 114 or the application 116. The secure operating environment 110 may be supported in software, hardware, firmware, or a combination thereof. The secure operating environment 110 may be implemented so that its execution and data space are isolated from other environments (e.g., the host operating environment 102) executing on the computing device. For example, processing resources and system resources of the computing device may be dedicated and/or protected for the secure operating environment 110. Such processing and/or system resources may include a secure memory or protected memory buffers. The secure memory may include and/or be used for executing the applications 114, 116 in the secure operating environment. The secure memory may be used or implemented for storing security information related to managing security for the secure operating environment 110. A secure storage solution that can manage implementation and use of memory for the secure operating environment 110 is described further with reference to FIGS. 3 and 4. The secure storage solution may store sensitive data for execution of the applications 114, 116 and/or operations performed by the applications 114, 116. The sensitive data may vary based on the type of such data, a type of application using such data, or other operations performed with respect to such data. Storage of sensitive data for the secure operating environment is described further with reference to FIGS. 3, 4, 6, and 7.

The dedicated and/or protected resources, such as processor(s) and/or memories, of the secure operating environment 110 may be different from the processor(s) and/or the memories that support operation of the host operating environment 102. In some embodiments, the dedicated memory for the secure operating environment may be used to store instructions and/or data for implementation of the secure operating environment 110. In some implementations, the secure operating environment 110 may have paging structures, exception handlers, protected memory regions and hardware resources dedicated or associated with the secure operating environment 110. A secure operating environment 110 may not be limited to but may be implemented using a secure element, SIM/UICC card, or virtualization technology available by the computing device 100. In some embodiments, the secure operating environment 110 may be tamper-resistant, such that it may protect its resources from being accessed beyond the bounds of its environment, such as by an untrusted host operating environment executing on the computing device. The secure operating environment 110 may further enable security services that prevent or protect access to memory of the secure operating environment 110 and/or the secure operating environment 110 during processing. For example, the secure operating environment 110 may prevent reverse engineering, debugging, tampering, or other operations designed to access the secure operating environment 110.

In one implementation, the secure operating environment 110 may be implemented using hardware assisted virtualization technology provided by the computing device 100. System and/or processing resources may be isolated for the secure operating environment 110 by using visualization technology. In some embodiments, the processor(s) may be enabled with hardware hooks that support virtualization technology. In some embodiments, a software abstraction layer may enable multiple operating systems and other clients to execute concurrently on a single processor, through the virtualization and portioning of physical hardware resources. In some embodiments, the secure operating environment 110 may be implemented using an application kernel that operates based on a non-native instruction set. The application kernel may include functional modules that enable the secure operating environment 110 to maintain a secure environment with respect to integrity and authenticity of data associated with the modules.

A variation in support for security functionality between any two computing devices may prevent applications that perform security sensitive functions and/or operations from executing on different types of computing devices. The significant variations in the operating environments for the various devices may lead to development of applications configured for use on a device having the least common denominator of security features offered by the device. It may be advantageous for different types of computing devices (e.g., mobile phones) to implement the secure operating environment 110 to provide security functionalities and services demanded by different types of applications regardless of the capabilities of the computing device. The secure operating environment 110 may provide a variety of security functions and/or services to provide a trusted environment to execute the applications. The applications may execution the security engine 112.

The secure operating environment 110 may include a security engine 112 that implements operations, processes, and/or methods for the secure operating environment 110. The security engine 112 may enable execution of applications (e.g., the application 114 and the application 116). In some embodiments, prior to execution of an application, the security engine 112 may enable the application for execution on the security engine 112. For example, the security engine 112 may perform one or more security services designed to implement an execution environment for the application. The security services may include those further described below. For example, the security engine 112 may allocate memory for the application using the secure storage solution of the secure operating environment 112. The security engine may determine security capabilities on the computing device 100 to determine a manner and mode for running the application. Based on the type of application, the security engine 112 may implement security for the application. Security may be implemented based on security policies defined by security policy information 138. The security policy may be used to determine criteria for enabling an application to execute in the secure operating environment 110. In some embodiments, the security policy may indicate services and/or capabilities to enable prior to execution of the application. For example, to enable an application for execution, the security engine 112 may determine authentication for a user of the application, and perform advanced access control for the secure operating environment 110. Enabling the application to execute in the secure operating environment may include provide storage via a secure storage solution described further below with reference to FIG. 3.

The security engine 112 may provide a callable interface, e.g., an application programming interface (API), that enables applications (e.g., the application 114 or the application 116) executing in the secure operating environment 110 to communicate with the security engine 112. Using the callable interface, the applications 114, 116 may communicate requests (e.g., a request 122) to the security engine 112. An application may send a request (e.g., the request 122) to the security engine 112 to access or receive security functionalities and/or services.

The request 122 may indicate information to be used for performing a requested security service or function. For example, the request 122 may include sensitive data (e.g., a key or a token) for storage during processing (e.g., payment processing) performed by the application 114. The request 122 may include criteria indicating one or more types of security services and/or functions that are requested. For example, the request 122 can indicate a cryptographic operation that is requested to be performed on sensitive data for the application 114. The request 122 can also be used to indicate an effective period when a security service is performed and/or when sensitive data is modified or deleted for the application 114. In some embodiments, the request 122 may include criteria that the security engine 112 may use to determine a type of security service to perform for the application 114. For example, the criteria may indicate a type of operation function (e.g., payment authentication) being performed for a payment processing application. In another example, the criteria may indicate a type of sensitive data (e.g., personal identification information) that is being handled by the application 114.

The security engine 112 may include a security services engine 132. The security services engine 132 may perform or enable various types of security services for the application. 114. Some of the security services may be requested directly by the application 114 and some may be performed based on the information included in or indicated by the request 122. Due to the differences in computing devices, such as mobile phones, security capabilities can vary between devices. The differences in the type and capabilities of the devices may pose a considerable challenge to managing security and integrity of information for applications. Some computing devices may provide security capabilities, but without knowledge of those capabilities, an application cannot depend on such security capabilities. The security services engine 112 offers many security services, among many others, that ensure applications are provided with security functionality which satisfy the variety of security needs an application may demand. The security services engine 132 can provide services that perform functions including security information management, memory management (e.g., memory allocation/deallocation, memory fragmentation management, memory isolation, memory scrubbing, memory rounding size and/or ceiling size management, etc.), data protection (e.g., cryptography services, hashing, random number generation, etc.), communication security (e.g., secure communication protocols) identity management (e.g., login and password management), authentication, access control, and/or privilege escalation detection. The security services provided by the security services engine 132 is described further with reference to FIGS. 3-7.

In some instances, it may be advantageous for an application to receive security services and/or functionality that are available in both the secure operating environment 110 and the host operating environment 102. In some embodiments, both environments 110, 102 may provide at least one security service based on availability of system and/or processing resources. The capability to provide a security service may be based on the security capabilities currently available in the computing device, including the secure operating environment 110 and the host operating environment 102, and/or the resources available in the computing device 100 to perform those security services. However, due to differences in functions and features of computing devices, such as mobile phones, such devices may have varying capabilities and resources to perform a security service. In some cases, the computing device 100 may not have any capabilities to provide a security service. It may be difficult for an application to be developed such that it may rely or determine the resources and/or capabilities of the computing device 100. As such, the secure operating environment 110 addresses these differences, enabling the application to receive security services based on a current availability of security capabilities. The security services may be provided to the applications 114, 116 based on security capabilities available in the secure operating environment 110 and security capabilities available from the computing device 100 including the host operating environment 102. In some embodiments, the security services provided by the security engine 112 may include security services enabled by the host operating environment 102. The security capabilities of the secure operating environment 110 and the host operating environment 102 are described further with reference to FIGS. 3 and 5-7.

The security services engine 132 can provide responses (e.g., a response 124) to a request from an application. The security services engine 132 may determine a result of services requested to for enabling execution of an application. A response 124 can indicate security services that may have been enabled and/or performed by the security engine 112. In some embodiments, the response 124 can indicate a result, (e.g., acknowledgement) of performing a security service. A result may include information (e.g., security information or a location in memory) usable to access sensitive data or receive a security service. For example, the response 124 can identify data that may be stored using the secure storage solution provided by the secure operating environment 110. In some embodiments, the response 124 can indicate information to enable the application to further determine a security service or security capability offered by the security engine 112.

In some embodiments the security decision engine 134 can store security capability information 130, which can indicate the security capabilities of the computing device 100. The security capability information 130 indicates security capabilities of the secure operating environment 110, the security capabilities of the host operating environment 102, or a combination thereof. An example of the security capability information 130 is described with reference to FIG. 4. The security capability information 130 may be generated dynamically by the security engine 112 or may be generated by a third party and stored on the computing device 100 to be accessible to the secure operating environment 110. Because the security capabilities of the computing device may change, the security decision engine 134 can periodically determine current security capabilities that are available in the computing device 100.

In some embodiments, it may be desirable for the security capability information 130 to be generated dynamically to account for changes in the host operating environment 102 and/or the secure operating environment 110. Because the security capabilities of the computing device 100 may change, the secure operating environment 110 may determine the security capabilities upon need, such as when a security service is being requested. The environments 102, 110 may change based on a variety of factors or conditions. For example, the environments 102, 110 can change based on availability of resources in the respective environments 102, 110. More or fewer resources may affect the ability of an environment to provide security services, thereby affecting the security capabilities of the environment. In some embodiments, the host operating environment 102 can modified or can change when it has been comprised, e.g., privilege escalation has been performed or attempted. Such changes in the environments 102, 110 may affect or comprise security capabilities. The secure operating environment 110 may consider the changes in the security of an environment when assessing and determining availability of security capabilities. The security capabilities information 120 can be updated to reflect changes in security capabilities affected by conditions in either of both of the environments 102, 110.

In some embodiments, the security decision engine 134 may dynamically determine the security capabilities of the computing device 100 based on the security capabilities of the host operating environment 102. The secure operating environment 110 may communicate with the host operating environment 102 by sending one or more requests 126 (e.g., the request 126) to the host operating environment 102. The request 126 can include or cause one or more method(s), process(es), instruction(s), commands(s), operation(s), or the like to be performed to determine a security capability of the operating system 104, the firmware 106, and/or the hardware 108.

In some embodiments, the request 126 may indicate a type of security capability or security service rather than a request for all security capabilities. For example, upon receiving a request 122 to perform a cryptographic operation, the security decision engine 134 may determine whether the host operating environment 102 can perform cryptographic operations. In some embodiments, the request 126 may include one or more operations, commands, or the like intended to determine security capabilities of the host operating environment to provide the security service requested by the application. The host operating environment 102 may communicate response(s) 128 that includes information which may indicate or may be useful to determine security capabilities of the computing device 100 to provide a security service.

In some embodiments the security capability information 130 may be used to determine security capabilities of the computing device 100. The security capabilities may indicate security services that can be performed by the operating system 104, the firmware 106, and/or the hardware 108. The security capability information 110 may indicate security capabilities based on a type of a device, types of operating systems 104, types of firmware 106, and/or types of hardware 108. In some embodiments, the secure operating container 119 may communicate a request 126 to the host operating environment 102 to determine a type of the device 100, a type of the operating system 104, a type of the firmware 106, and/or a type of the hardware 108.

In some embodiments the applications 114, 116 can request (e.g., the request 122) a security policy for managing one or more services for the applications. The request can indicate security services or type of security, a type of security policy to implement, a level of security, information used to determine a level or profile of security for the applications, or a combination thereof. The security services engine 132 can determine the type of security services to provide based on the information provided by the applications 114, 116. For example, when the application 114 is a payment application, the request 122 may indicate a request for a high level of security. In some embodiments, the security services engine 132 may dynamically determine a security policy for managing security for an application. As shown by the examples in FIGS. 6 and 7, a security policy may be applicable based on a variety criteria including the type of an application, the operations performed by the application, the request 126, or other information indicating the nature of the operations performed by the application. The secure operating environment 110 may determine a security policy for an application based on satisfying the criteria for a particular security policy.

The security operating environment 110 may manage security policy information 138 for the secure operating environment. The security policy information 138 may indicate specific criteria for choosing security services. In some embodiments, the security policy information 138 may indicate events and/or conditions under which security services are to be rendered for the application. The security policy information 138 may be generated based on information received in the request 122. Alternatively or additionally, the security policy information 138 can be generated by a third party and provided to the computing device 100. In some embodiments, the security policy information 138 may be sent, and updated periodically from a remote computing device (e.g., security server) via a communication connection. Examples with respect to the security policy information 138 are described with reference to FIGS. 6 and 7.

Security Decision Engine

Figure 2:
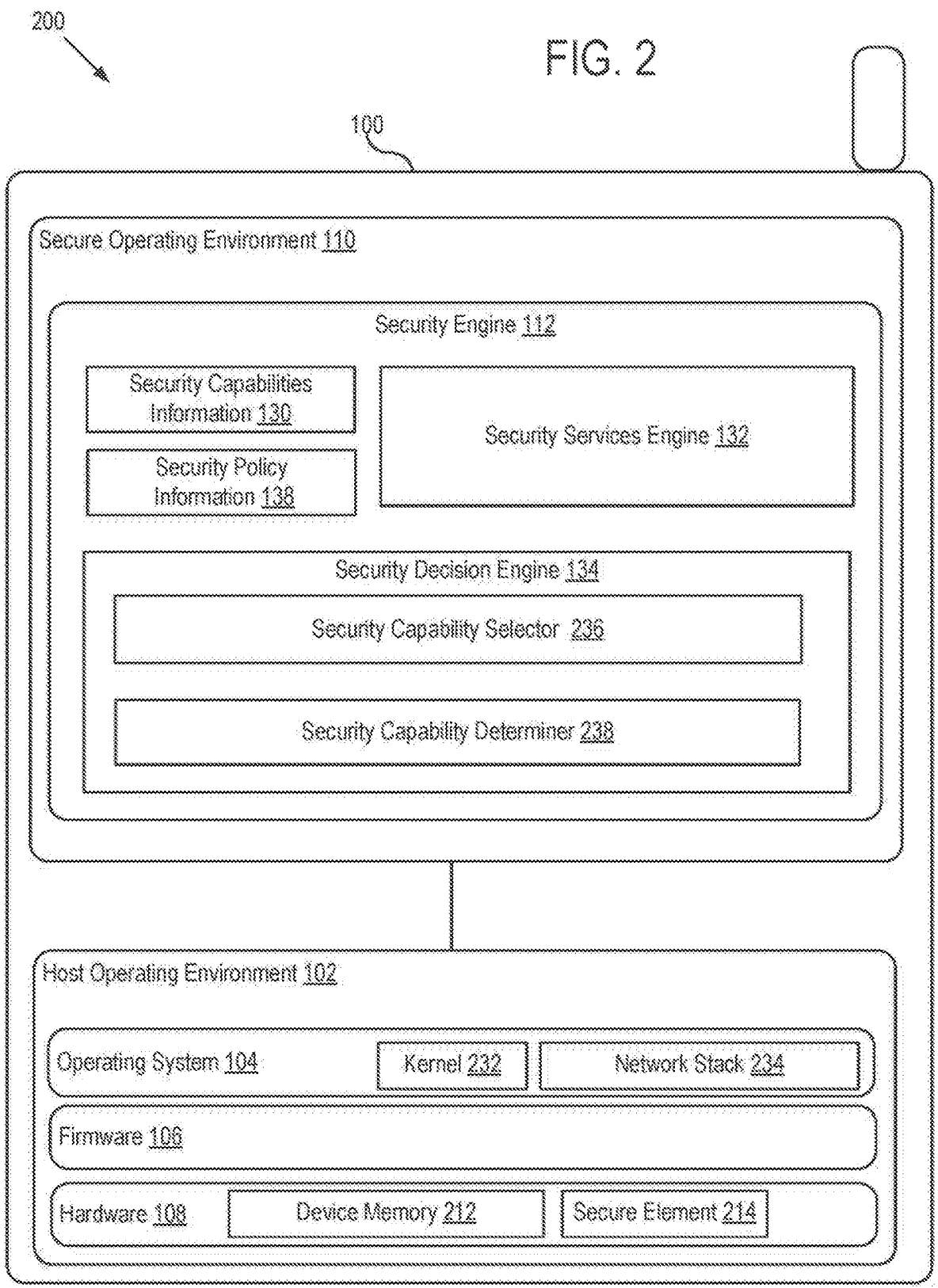
FIG. 2 shows a computing device including a secure operating environment according to some embodiments of the present invention.

Now turning to FIG. 2, the computing device 100 is shown according to some embodiments of the present invention. In such embodiments, the security decision engine 134 of the secure operating environment 100 is shown including several components. The security decision engine 134 may include a security capability selector 236 and a security capability determiner 238. FIG. 2 shows some embodiments of the host operating environment 102.

In FIG. 2, the operating system 104 may include a kernel 232. The kernel 232 may provide an interface between applications executing on the computing device 100 using system resources. For example, the kernel 232 may process requests (e.g., the request 126) from an applications and/or the secure operating environment 110 and translates them into system calls to interact with components (e.g., the firmware 106 and/or the hardware 108) of the computing device 100.

The operating system 104 may include network stack 234. The network stack 234 may provide the operating system 104 and the applications with an interface to communicating with external devices. The network stack 234 may also provide secure communication channels to allow mobile device to communicate securely with an external device or entity. The secure communication may be implemented using different security protocols (e.g., SSL).

The firmware 106 may include a set of protected code that interacts closely with hardware components and is executed during startup of the computing device 100. The firmware 106 may include initialization code that may be used to initialize and setup she hardware configuration of computing device 100. A boot loader may be used by the firmware 106 to load the operating system 104 during startup. After startup, the firmware 106 may provide an interface through which the operating system 104 can manage and control the hardware 108. The firmware 105 may be stored in a read-only or write-protected memory, and may be updated infrequently or not at all during the lifetime of the computing device 100.

The operating system 104, the firmware 106, the hardware 108, or a combination thereof may provide security capabilities to an application executing on the computing device 100. The security capabilities may vary based on a type of components used to implement the host operating environment 102. The security capabilities of the computing device 100 may be determined using information such as the device manufacturer of the computing device 100, a type of the operating system 104, a type of the firmware 106, a type of the hardware, or a combination thereof. These security capabilities may be stored in the security capability information 130 or may be ascertainable from information about the computing device 100 by provided by a third party (e.g., a device manufacturer or components manufacturer).

Some security capabilities of the computing device 100 are described below for purposes of illustration and are not meant to represent an exhaustive list. In some embodiments, the hardware 108 may implement at least some security capabilities of the computing device 100. For example, the hardware 108 may include components that provide security capabilities. The hardware 108 may include a device memory 212 for storing sensitive data and security sensitive applications. The device memory 212 may provide an access interface that prohibits access to the storage area except for trusted applications and trusted entities. In some embodiments, device memory 212 can be implemented as a memory chip (e.g., an integrated memory chip in the computing device 100, or in a user removable memory card), as part of a secure element, as part of a SIM or any combinations thereof.

Another security capability provided by the hardware 108 can include a secure element 214, e.g., a SIM card, which is included in the hardware 108. The secure element 214 may be a user removable component that securely stores an international mobile subscriber identity (IMSI) and the related cryptographic keys used to identify and authenticate a subscriber or user of the computing device 100. The secure element 214 can additionally store other sensitive data and/or security sensitive applications, and provide an operating environment for applications to execute from. The secure element 214 can also be used as device memory 212 or to supplement the device memory 212.

In some embodiments, one or both of the firmware 106 or the hardware 109 may implement a Root of Trust (RoT) as a security capability. The RoT may include a set of trusted security functions for performing security-critical operations, such as measuring/verifying software and hardware configuration, protecting cryptographic keys and performing device authentication. In some embodiments, the RoT may additionally be implemented with software components residing outside firmware.

In some embodiments, one or a combination of the operating system 104, the firmware 106, or the hardware 108 may provide cryptographic capabilities for performing operations. The cryptographic capabilities may include encryption, decryption, and hashing. The cryptographic capabilities may include the ability to perform cryptographic operations.

In some embodiments, the hardware 108 and/or the operating system 104 may provide secure input/output mechanisms. Examples of such mechanisms may include pin entry that enables protection against snooping of the keystrokes and mechanisms for trusted output, which may include an indication (e.g., in form of an image or sound) that the page or website being viewed by the user using the mobile device is authentic and/or not tampered.

An application that executes in a host operating environment 102 can take advantage of the security capabilities of the host operating environment 102. The security features available to an application may vary between computing devices. In some embodiments, applications may be unable to account for the variations in security features and capabilities between different devices. For applications that use or store highly sensitive data, the applications may have only so many options for creating a secure environment. The security engine 112 of the secure operating environment 110 may provide a more flexible and adaptable environment to identify and utilize the security capabilities of environments in a computing device. Further, the security engine 112 can supplement or improve upon existing security features by providing additional or different security services that can satisfy a security environment desired for different types of environments.

The secure operating environment 110 may use the security decision engine 134 to determine the security capabilities available from the secure operating environment 110 and/or from computing device 100. By providing services by choosing from available security capabilities the security decision engine 134 can provide a more robust and secure environment; for execution of applications. The security decision engine 134 further enable selection of the security capabilities suitable for the needs of the application, thereby reducing a burden on the application to determine available security capabilities. Additionally, the security decision engine 134 can choose from the available security capabilities to provide security capabilities that afford greater security or suitability for the application.

The security capability determiner 238 may determine the security capabilities of the computing device 100 and any secure operating environments 110 that may be executing on the computing device 100. The security capabilities of the computing device 100 can include security capabilities of the host operating environment 102 and/or components of the host operating environment 102. In some embodiments, the security capability determining 238 may determine the security capabilities of a secure operating environment 110 and the secure capabilities of the computing device 100 using the security capabilities information 130. The security capabilities information 130 may be usable to lookup or to determine the security capabilities of the computing device 100 or any of its components and/or a secure operating environment, based on a variety of attributes. The attributes can include, among others, a type of security service, a type of device, a type of operating system, a type of hardware, a type of firmware, a type of security, a security policy, other information useful for identifying security capabilities, or a combination thereof. For example, the security capability determine 238 can search the security capabilities information 130 to identify security capabilities based on a type of the computing device 100. In another example, the security capabilities information 130 can be searched based on a type of security service requested. The security capability determiner 238 can determine whether a security service or a particular type of function can be supported.

The security capability determiner 238 may use the security capabilities information 130 to determine the security capabilities of the host operating environment 102. In some embodiments, the security capability determine may communicate requests 126 to the host operating environment 102 for information to determine a type of one or more of the following: the computing device 100, the host environment 102, the operating system 104, the firmware 106, the hardware 108, other components of the computing device 100, or a combination thereof. This information about the computing device 100 can be used to lookup or determine security capabilities of the computing device using the security capabilities information 130.

In some embodiments, the security capability determiner 238 can dynamically determine the security capabilities of the computing device 100 based on the security capabilities of the host operating environment 102. The secure operating environment 110 may communicate with the host operating environment 102 by sending the request 126 (e.g., the request 126) to the host operating environment 102. The request 126 can include or cause one or more method(s), process(es), instruction(s), commands(s), operation(s), or the like to be performed to determine a security capability of the operating system 104, the firmware 106, and/or the hardware 108. For example, the request 126 may include commands to determine a digital fingerprint of components in the host operating environment 102. The digital fingerprint may be used to assess whether the host operating environment 102 has the capability to provide certain types of security functions. In some embodiments, the secure operating environment 110 can determine security capabilities during initialization of the secure operating environment 110. During initialization, the secure operating environment 110 may analyze the environment on the computing device 110 to assess the security capabilities. The secure operating environment 110 may determine security capabilities based on a chain of trust is established with one or more components of the host operating environment 102.

The security decision engine 134 may include a security capability selector 236 to select one or more security capabilities from the security capabilities determined by the security capability determiner 238. The security capability selector 236 can select security capabilities based on different criteria. The criteria can indicate the types of security services sought by the application. The criteria can indicate other types of constraints indicating the types of security functionalities, a level of security, a security policy, other information identifying type of security desired for an application, or a combination thereof. In some embodiments, the criteria may indicate specific conditions, such as a sensitivity of data, or specific security functionality desired. The criteria may indicate whether security capabilities are sought from the secure operating environment 110, the computing device 100, or both.

In some embodiments, the security capability selector 236 can choose the security capabilities based on the security to protect an application executing in the secure operating environment 110. For example, the security capability selector 236 can select one or more security capabilities that are suitable for a type of security services (e.g., data protection) requested or needed for an application. In such embodiments, the security capability selector 236 can determine the security capabilities that are related to and/or offering a capability to enable or provide such security services to the application. For example, when data protection is desired, the security capabilities selector 236 can choose the security capabilities (if any) that can support or provide security for data protection. In one example, the security capabilities selector 236 can choose the security capabilities such as different cryptographic algorithms and different types of storage for storage of sensitive data offered by the secure operating environment 110 and the host operating environment 102. The security capability selector 236 can determine on the security capabilities, the security capabilities that meet the criteria specified by the security services engine 132. The security capability selector 230 may provide information to the security services engine 132 indicating those security capabilities that have been selected based on the criteria. The selected security capabilities can be used by the security services engine 132 to choose security services to provide to the application based on its request (e.g., the request 122).

Security Services Engine

Figure 3:
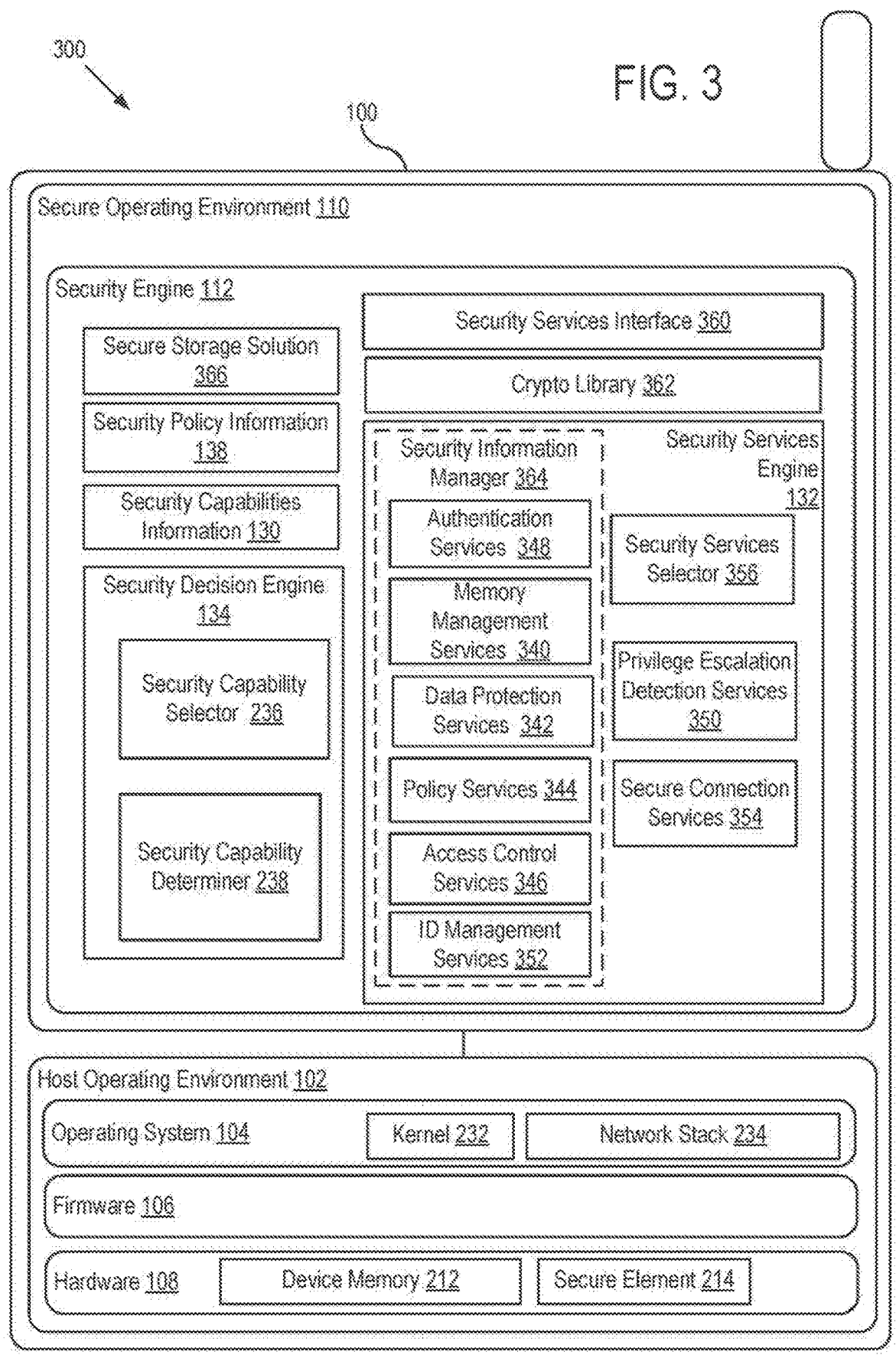
FIG. 3 shows a computing device including a secure operating environment according to some embodiments of the present invention.

FIG. 3 shows the computing device 100 according to some embodiments of the present invention. The security engine 112 may include a security services interface 360 that enables applications to request security services from the security engine 112. The security services interface 360 may support requests for specific types of security services and/or requests including criteria that can be used to identify security services to provide to an application. For example, the security services interface 360 may support requests for security services such as memory management, data protection, communication security, identity management, authentication, access control, and privilege escalation detection. Using the security services interface 360, an application can request a specific security service or a type of security protection.

FIG. 3 also shows components that may be included in the security services engine 132. The security services engine 132 may include a security services selector 356 to aid in the selection of security services to provide to an application in response to the request 122. The security services engine 132 may include one or more components, each configured to determine and provide security services offering security protection. In some embodiments, the components for security services engine 132 can include memory management services 340, data protection services 342, policy services 344, access control services 340, authentication services 348, privilege escalation detection services 350, identity management services 352, and secure connection services 354.

In some embodiments, the security services engine 132 may include a component that utilizes services provided by one or more of the components 342-354. For example, the security services engine 132 may include a security information manager 364 that can include authentication services 348, memory management service 340, data protection services 342, policy services 344, access control services 346, and ID management services 352. The security information manager 364 may implement a secure storage solution 366.

The security services selector 356 may request one or more services from one or more of the service components 340-354, 364 upon determining a security service to enable/perform for the application. In the instances where the security services selector 356 determines that the request indicates the security services desired, the security services selector 356 can invoke the components to provide those services upon making such a determination. The service components 340-356, 364 can include logic to provide the service based on security capabilities for the type of service supported by a corresponding component.

The security services selector 356 can choose the security services to provide an application. The security services may be chosen based on information indicated in a request (e.g., the request 122) from an application. As explained earlier, a request received from an application may indicate criteria identifying one or more security services desired. The criteria may indicate one or more security services, a type of the application, a level of security, a security policy, a type of security, sensitivity of data, a type of operation to be performed by the application, other information that indicates or can be used to determine a security service, or a combination thereof. The criteria may indicate a time period for performing the security services and/or conditions for performing security services.

In some embodiments, the security services selector 356 may determine whether the secure operating environment 110 and/or the computing device 100 will provide a type of service sought for the application. The security services selector 356 may request the security decision engine 132 to determine the security capabilities of the computing device 100, the secure operating environment 110, or both. A request to the security decision engine 134 may indicate that all the security capabilities of the computing device 100 and/or the secure operating environment 110 are to be determined. The security services selection 356 may use the security capabilities to determine those that can support services desired by the application if specific type of service is being sought. In some embodiments, a request to the security decision engine 132 may include the criteria received in the request from the application. The security capabilities identified by the security decision engine 134 may include those which can support the security services identified by the criteria. The security services selector 350 can use the identified security capabilities to select services to be provided to an application. Alternatively or additionally, the security services selector 356 may use the security capabilities information 130 to determine security capabilities of the secure operating environment 110 and/or the computing device 100.

In some embodiments, the security services selector 356 may perform processing to choose between different security capabilities to provide a security service In some instances, the secure operating environment 110 and the host operating environment may both provide security capabilities that support similar types of security services suitable for a type of service to be performed for an application. For example, the security services engine 132 may provide cryptographic services and the host operating environment 102 may provide cryptographic services. However, the cryptographic services may vary based on the security capabilities of the each environment 102, 110. In this example, the security services selector 356 may choose between both cryptographic services to determine the cryptographic service that satisfies the criteria indicated by the application. The security services selector 356 may choose one cryptographic service over another that offers a stronger type of encryption preferable for sensitivity to provide security for the application.

The security services selector 356 may choose one or more security services based on security capabilities that enable suitable protection of operations performed by an application. In some instances, a security service may be selected from security capabilities of one or both of the secure operating environment 110 and the host operating environment 102 based on the security capabilities that meet the criteria or that support a security service requested by an application. The security services selector 356 may use the security capabilities information 130, an example of which is shown in FIG. 5, to determine the security services available in the different environments 110, 102. In some embodiments, the security services may be selected based on consideration of system and processing resources of the environment that has security capabilities which support the security services. It may be advantageous in some instances to have one type of security service performed by the secure operating environment 110 and another type of security service performed by the host operating environment 102.

In some embodiments, security services may be chosen for an application based on a level of security enables protection of operations performed by the application. The level of security may be determined based on criteria such as a type of the application, a type of operation being performed, sensitivity of data, or other criteria that may indicate a level and/or type of security to provide to an application. The security services selector 356 may determine a level of security using the security policy information 138. The security policy information 138 may provide information that identifies security services that provide security to different types of applications based on a corresponding level of security. The security policy information 138 may be used by the security services selector 356 to determine the types of security services to perform based on criteria indicated by the security policies. The security services selector 356 may use the security capabilities information 130 to determine the security services that can be implemented. In some cases, when a desired security service is unavailable due to a lack of security capabilities, the security policy information 138 may be used to identity alternative security services that can be performed for an application. Examples of different security policies implemented by the security services engine 132 are described with reference to FIGS. 6 and 7.

Upon determining a security service to provide to an application the security services selector 356 may request one or more of the components 340-354 to provide security services to the application. Each of the components 340-354 may provide an indication of an outcome of a service to the security services selector 356. In some embodiments, when a security service cannot be performed, the security services selector 356 may determine other alternative security services to perform to replace the security service(s) that could not be performed. The alternative security service(s) may be chosen based on the security capabilities identified earlier. In some embodiments, the security services selector 356 may determine chose a security service based on currently available security capabilities of the environments 110, 102, which can change. The security services engine 132 may provide a response (e.g., the response 124) to the application indicating an outcome of the request. In some embodiments, the response may indicate acknowledgement of a request or notification that the security services have been enabled.

A. Secure Storage Solution

The secure storage solution 366 may store sensitive data including security information (e.g., certificates, keys, or password) for the secure operating environment 110 and the applications executing in the secure operating environment 110. The secure storage solution 366 may include memory allocated to the secure operating environment 110. The memory may include persistent storage. The secure storage solution 366 may manage storage of security information (e.g., implementation of storage structures), such as keys, certificates, or the like. In some embodiments, the secure storage solution 366 may maintain different types of security information. The secure storage solution 366 may utilize a single memory, or may use memories in a distributed manner, including persistent memory, memory of the secure operating environment 110 and/or memory of the computing device 110 (e.g., the device memory 212 and/or the secure element 214).

The secure storage solution 366 may improve performance for managing security of for security information by morphing and obfuscating the memory managed by the secure storage solution 366, thereby prevent unauthorized entities from determining security and/or gaining access to the content managed by the secure storage solution 366. The secure storage solution 366 can manage sensitive data using cryptographic information. In some embodiments, the secure storage solution 366 may offer robust protection by implementing the secure storage solution 366 using information stored outside of the computing device 100. For example, storage of security information managed by the secure storage solution 366 may be protected based on information (e.g., cryptogram values, seed data, or encrypted information) stored at a remote server (e.g., a backend security server). The information may be transformed into forward progressing code using an encoder. The forward progressing code can be used to implement storage by the secure storage solution 366. A certain level of assurances for security can be guaranteed by mutating, on a period basis, or revoking storage of security information managed by the secure storage solution 366 by being mutated on a periodic basis.

In some embodiments, storage managed by the secure storage solution 366 and its contents may be modified (e.g., mutated or morphed) in a time-bound manner to obfuscate and protect sensitive data including security information. For example, the secure storage solution 366 can regenerate or modify storage based on information from a remote computing device so as to prevent an unauthorized entity from determining the security mechanisms used to protect the secure storage solution 366. The security information may be associated with a sub-type or sub-classification based on a state of the data (data-at-rest, data-at-use, data-in-transit, or a combination thereof). Cryptographic codes (e.g., cryptograms) and/or reliability codes may be used to perform the changes according to a time-bound schedule and changes in state of the data. The secure storage solution 366 may be maintained by the secure operating environment 110 to remain under the control of the security operating environment 110. By modifying the secure storage solution 366 in this manner, the secure storage solution 366 provides assurances from rollback and/or replay attempts to use or access security information.

In some embodiments, the security information manager 364 may detect events related to access of the secure storage solution 366 or may utilize any of the others components 342-354 to detect whether security in the computing device 100 has been compromised. Upon detection of an event, the security information manager 3464 may modify storage managed by the secure storage solution 366. For example, storage provided by the secure storage solution 366 may be mutated upon examination of a level of security of a past transaction. In some instances, the security information may be revoked from use to prevent access if it is determined that security may have bees compromised.

B. Memory Management Services

The memory management services 340 may provide security services which include protecting the security and integrity of sensitive data for an application. The memory management services may provide end to end lifecycle management of memory for the secure operating environment 110. For example, the memory management services 340 may facilitate storage of sensitive data for the secure storage solution 366 and/or protected memory of the secure operating environment 110. The memory management services 340 may also facilitate storage of data including sensitive data, for an application in storage provided by the hardware 108 of the host operating environment 102. In some embodiments, the security services selector 356 may provide criteria to the memory management services 340 that can be used by the memory management services 340 to determine a location and/or manner for storing data (e.g., sensitive data) belonging to a application. The criteria may indicate a level of security or other information that can be used to determine a level of security for an application.

The memory management services 340 can perform a variety of services to ensure secure memory management for the secure operating environment. The memory management services 340 can perform, among other functions, allocation and de-allocation of memory, memory isolation, scrubbing, memory fragmentation management, memory recovery, memory initialization, and memory rounding size and ceiling size management. Memory of the secure operating environment 110 may be managed according to different security policies. By securing management and use of memory, assurances can be provided and integrity of memory can be guaranteed to applications executing in the secure operating environment 110.

In some embodiments, the memory management services 340 may perform any one of the memory management functions with respect to the memory in response to detecting an event (e.g., a security-related event or threat) related to the memory. For example, an event can include a change in state of the memory, suggestive of an unauthorized attempt to access the memory from outside the secure operating environment. In some embodiments, memory management may be time-bound, performed according to a schedule to ensure that memory is routinely managed for security. The memory management services 340 may also perform a memory management service 340 in response to detecting that the secure operating environment 110 and/or its memory are being attacked or have been compromised. The memory management services 340 may use data gathered from behavior of the secure operating environment 110 or from other security services to determine a state of the system. The memory management services 340 may be performed upon request by an application for secure storage of data for an application. Alternatively or additionally, an application can request one or more specific storage services to be performed for the application.

In some embodiments, the memory management services 340 may utilize a memory management table to monitor and adjust memory resources of the secure operating environment 110. Security indicators (e.g., a security fault) may be inserted in memory allocated to the secure operating environment 110 to ensure that security properties of the memory are maintained. Using the table, an occurrence of a security indicator may be identified based on an unauthorized attempt to access the memory resources of the secure operating environment 110. The security indicators may be used to check data integrity of the particular location of memory. Security indicators may be monitored to prevent the memory resources of the secure operating environment 110 from being compromised to the host operating environment 102 that may otherwise gain access to sensitive information for controlling the applications. An occurrence of a threat based on a security indicator may be identified when information (e.g., an integrity checksum value) corresponding to a particular security indicator in the table does not match a value of information stored in a particular portion of memory allocated for the secure operating environment 110.

In response to detecting an event or identifying a threat, the memory management services 340 may perform a variety of memory management techniques to protect integrity of the memory. For example, memory may be allocated and/or de-allocated before and after an event (e.g., processing a payment transaction) so as to ensure that memory used by the application is not left containing remaining information related to the event. The memory management services 340 may scrub it (e.g., clean) the memory used by an application after an event to prevent information from being left behind in memory. Upon detecting an event that memory has been compromised, memory may be isolated to prevent use of the compromised memory. Memory fragmentation management can be performed to reduced memory fragmentation m prevent fragmented memory from being access by unauthorized entities. The memory management services 340 can also perform rounding and ceiling size management to present overflow values from being stored in memory to attack an application or process in the secure operating environment 110.

C. Data Protection Services

The data protection services 342 may perform cryptographic operations and/or functions for an application. The cryptographic services 342 may be performed in response to a request by the security services selector 356 to perform a cryptographic operation. In some embodiments, the cryptographic services 342 may communicate with the host operating environment 102 to perform cryptographic services that are provided by the host environment 102. The cryptographic services that are performed may be chosen based on criteria such as a level of security. In some embodiments, the data protection services 342 may perform one or more cryptographic operations along with sending a request to the host operating environment 102 to perform cryptographic operations.

The data protection services 342 may include data encryption using known encryption methodologies, such as AES, DES, and/or Triple-DES. other data protection services 342 may include hashing, random number generation (RNG), other data security management techniques, or a combination thereof. The data security management techniques may include implementing policies or techniques for management of sensitive data. The sensitive data may be managed based on a time-bound schedule. For example, sensitive data may be managed based on events related to use or storage of the sensitive data. The cryptography techniques may also include preventing rollback and/or replay attempts to sue or access stored sensitive data, such as keys and tokens.

In some embodiments, the security engine 112 may maintain a crypto library 362. The crypto library 362 can include cryptographic functions and cryptography information (e.g., cryptographic codes, keys, and/or passwords). The crypto library 362 may be used to implement cryptographic functions and to store security information (e.g., sensitive data) to provide enhanced security and protection for applications executing in the secure operating environment 110. The crypto library 362 may provide cryptographic codes and/or reliability codes to modify, revoke and/or mutate the security information. The integrity and authenticity of security information may be maintained by changing the security information according to different techniques described herein.

D. Policy Services

The policy services 344 may enable the creation and management of security policies for managing security in the secure operating environment 110. One or more security policies may be created (e.g., pre-defined or dynamically created) and stored in the secure operating environment in the security policy information 138. In some embodiments, security policies may be created and developed based on a security profile. A security profile can be maintained for applications. The security profile can be developed based on the sensitivity of the data for an application, the type of an application, and/or the types of security services requested for the application. In some embodiments, an application can request the security engine 112 to create a security policy based on criteria specified in the request. The security policies may be used to manage security for applications. The security engine 112 can use the security policies to manage levels of security for application executing in the secure operating environment 110. In some embodiments, the security profile information 138 may be received from a remote computing device (e.g., a security server). Receiving the security profile information 138 from a remote location may support remote policy management, which may prevent security for the secure operating environment 110 from being compromised. For example, the policy services 344 may manage security policies using techniques such as those described with reference to FIGS. 6 and 7.

E. Access Control Services

The access control services 346 may provide centralized access control and policy enforcement for access to resources in the secure operating environment 110. Examples of access control may include advanced access control (e.g., fine grain access control) to prevent access to secured resources in certain states. For instance, in non-root mode the user may not be able to change certain settings on the device or may have read only privileges for certain resources (e.g., sensitive data) associated with an application. For policy enforcement, the access control services 346 may manage certain important aspects, such as disabling certain features (e.g., Bluetooth) while using certain sensitive applications (e.g., payment application).

F. Authentication Services

The authentication services 348 may enable an application to authenticate a user locally in the secure operating environment 110 or via communication with a remote server. In one example, the authentication services 348 may authenticate a user and/or a payment transaction conducted via a payment application executing in the secure operating environment 110. The authentication services 348 may reduce complexity for enabling an application to perform authentication. The application can simply communicate a request via the security services interface 260 to request authentication or information stored for the authentication. In some embodiments, the secure operating environment 110 may generate a secure channel between the computing device 110 and a remote server to complete a transaction. In one implementation, several different authentication services using one or multiple authentication remote servers may be used for authenticating a transaction. In some implementations, the type of transaction may determine the authentication service and authenticating remote server used. The authentication services 348 may provide a response (e.g., the response 124) that indicates acceptance, denial, and/or feedback about the transaction. The authentication services 348 may communicate with the host operating environment 102 to receive secure input for authentication.

G. Privilege Escalation Detection Services

The privilege escalation detection services 350 may enable the security engine 112 to determine whether privilege escalation (e.g., jail-breaking or rooting) has occurred on the computing device 100. In privilege escalation, the privileges on the computing device 100 may be escalated such that access to resources in the computing device 100 is compromised. As a result, access the resources of the computing device 100 may become accessible to an unauthorized user, application, device, and/or process. Privilege escalation may enable security of the computing device 100 to be compromised (e.g., bypassed), thereby enabling any application that may not be approved by the vendor) to be installed on the computing device 100. The escalated privileges may comprise resources that are allocated for the secure operating environment 110. To ensure that the secure operating environment 110 is in fact secure, the privilege escalation services 354 may determine whether privilege escalation has occurred. Privilege escalation detection may be difficult to implement by the computing device 100 since the host operating environment 102 would need to determine whether privileges to its access have been altered. Since the secure operating environment 110 is secure, trusted, and tamper-resistant, the secure operating environment 110 may encounter less difficulty in identifying an occurrence of or attempt to perform privilege escalation. In one implementation, the privilege escalation detection services 350 may use behavior analyses, fingerprinting, etc. to determine if privilege escalation has occurred.

In some embodiments, the privilege escalation services 350 may be performed before the security engine 112 determine security services that can be provided to an application. For example, prior to determining security capabilities of the computing device 100 and/or the secure operating environment 110, the privilege escalation detection services 350 may determine whether privilege escalation has occurred or been attempted on the computer device 100. In such embodiments, the security decision engine 134 may not select a security capability of the host operating environment 102 to avoid a potential security breach caused by the privilege escalation.

H. Identity Management Services

The identify (ID) management services 352 may provide services to manage user identifies, such as single sign-on identities, and abstract away details of managing and safeguarding the identity of the user. In some embodiments, the ID management services 352 may enable different applications to use a federated ID to access different services provided by the secure operating environment. For example, the federated ID may enable a user to use an application on the computing device 100 to conduct transactions at two different merchants using two different accounts.

I. Secure Connecting Services

The secure connection services 354 may implement communication with external computing devices using a variety of different security communication protocols for isolation and protection of data and communication. The different security communication protocols may include Virtual Private network (VPN), Transport Layer Security (TLS) and/or SSL.

In some embodiments, the secure connection services 354 may facilitate a connection to a remote computing device (e.g., a security server) to obtain information (e.g., cryptograms) and other security information to manage the secure storage solution 366. The security information manager 364 may use the information received from the remote computing device to mutate and change properties and/or storage for the secure storage solution 366 to prevent unauthorized access to security information. For example, the security information may be generated based on information (e.g., seed data or encrypted information) stored at a remote server (e.g., a backend security server).

Example: Storage of Sensitive Data In a Secure Operating Environment

Figure 4:
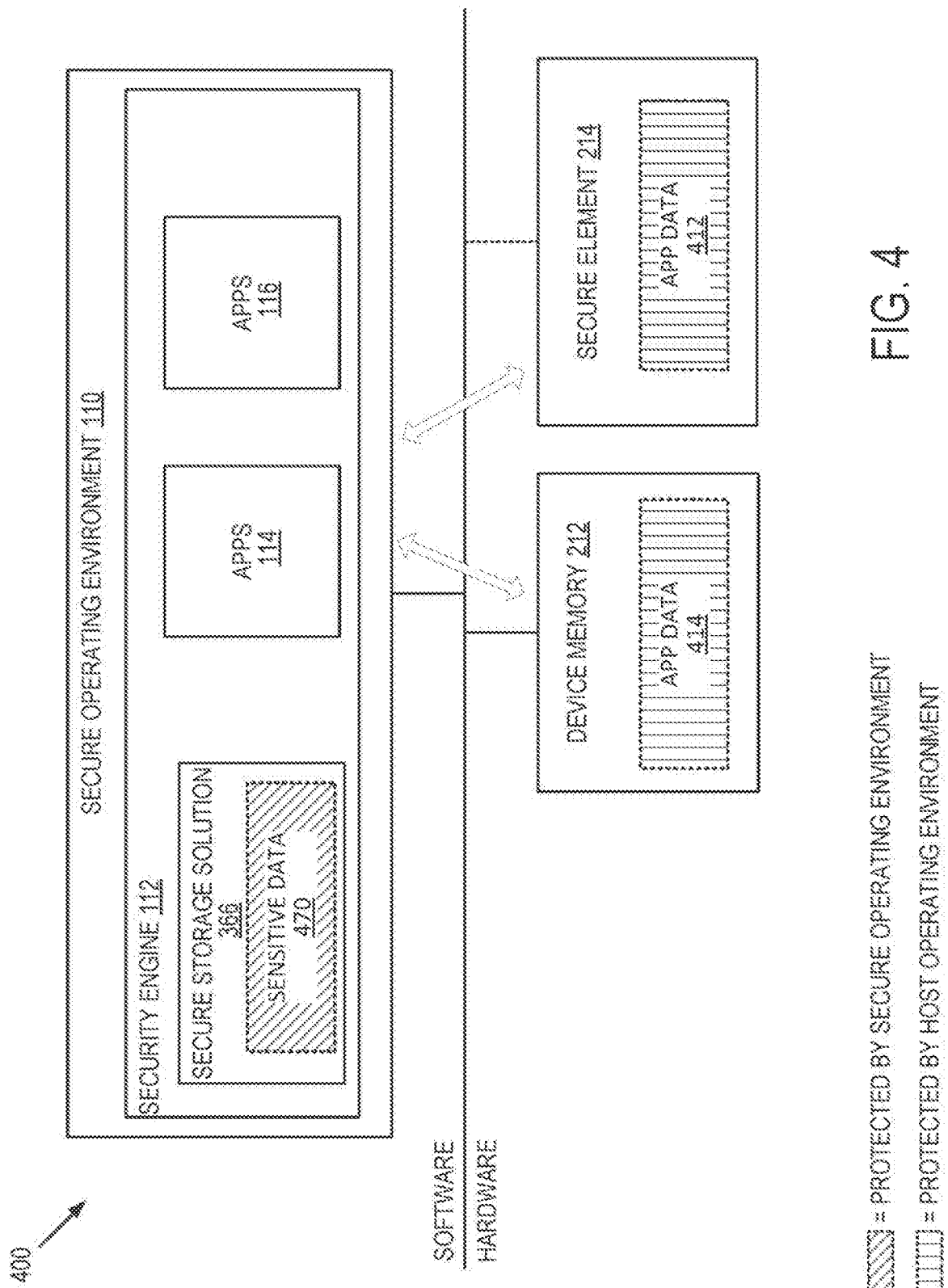
FIG. 4 shows a computing environment of a computing device that implements a secure operating environment according to some embodiments of the present invention.

FIG. 4 shows a computing environment 400 of a computing device (e.g., the computing device 100) that may implement a secure operating environment (e.g., the secure operating environment 110) according to some embodiments of the present invention. FIG. 4 shows data storage in a secure operating environment in comparison to data store in other environments on a computing device.

The computing environment 400 may have various software and hardware components. For example, the computing environment 400 may include device memory (e.g., the device memory 212), and a secure element (e.g., the secure element 214). The secure element 214 can be implemented as an embedded component or as a removable component such as a SIM card or a SD card, and may include a combination of various memory types, such as, volatile memory, non-volatile memory, cache, etc. Volatile memory is computer memory that requires power to maintain the stored information (e.g., SRAM, DRAM, etc.). Non-volatile memory is computer readable and/or writable memory that can retain the stored information even when not powered. Examples of non-volatile memory include read-only memory (see ROM), flash memory, etc. The device memory 212 may be implemented in hardware. All or part of the device memory 212 may be shared with other system resources, and may be used by multiple operating environments.

The computing environment 400 may include software components that can implement various operating environments, such as the secure operating environment 110 and a host operating environment (not shown) on the computing device. Operating environments implemented using software components may be implemented using hardware components and/or firmware components. For example, the secure operating environment 110 may be implemented such that it has dedicated system and processing resources, independent of other operating environments in the computing environment 400. The secure operating environment 110 may be physically isolated from in the computing environment 400.

A secure operating environment, such as the secure operating environment 110 may be supported by a security engine, e.g., the security engine 112. The security engine 112 may enable applications (e.g., the application 114 and the application 116) to operate in a secure manner. In some embodiments, the security engine 112 may implement a secure storage solution 366 for secure storage of information for the secure operating environment 110. The secure storage solution 366 may use memory that is different from memory used to implement other environment (e.g., a host environment) on the computing device 100. The secure storage solution 366 may securely manage storage of sensitive data (e.g., the sensitive data 470) for the applications executing in the secure operating environment 110. As explained earlier, the security engine 112 may provide security services to the applications executing in the secure operating environment 110. Implementing a secure operating environment using such techniques described herein may enable the sensitive data for the applications to be protected from access by other environments within the computing environment 400.

The storage of highly sensitive data 470 for applications can be maintained separately by the secure storage solution 366 from storage of other data for the applications, such as application data ("app data") 412, 414, stored in other memory (e.g., the secure element 214 and the device memory 212) on the computing environment 400. In some embodiments, the security engine 112 of the secure operating environment 110 can determine a location for storing data for the applications 114, 110 based on a variety of factors including the sensitivity of the data itself, the type of application, the type of operations performed by those applications, or other criteria related to use of the data. For example, data used to process transactions for a payment application may include account information, which may be regarded as highly sensitive, and therefore, may be stored securely under the protection of the secure operating environment 110.

App data 412, 414 which may not be deemed highly sensitive or may be deemed less sensitive that the sensitive data 470 may be stored in different memory on the computing environment 400, such as the device memory 212 and/or the secure element 214. Data that is not protected by the secure operating environment 110 may receive protection under the security mechanisms supported by the host operating environment 102. For example, the applications 114, 116 may use the app data 412 for less-sensitive operations. In such an instance, the app data 412 may be stored in the secure element 214 where the app data 412 may still receive the benefit of security and isolation from some components of the computing environment 400, but may not need support of the security services offered by the security engine 112.

In some embodiments, the security engine 112 may dynamically determine sensitivity with respect to the data for an application, and may modify a location of the data based on the sensitivity. For example, a location of the data may be modified based on the sensitivity of the operations performed by the application with respect to the data. In some embodiments, when a location of data is changed, the security engine 112 may modify the data to conform to the security mechanism(s) supported by the environment supported the memory including the modified location. Changes in sensitivity of the data, either based on the content of the data or operations performed using the data, may trigger movement of the data from one storage location to another. For example, the app data 414 may be moved to storage managed by the secure storage solution 366 when the app data 414 performs highly sensitive operations. In another example, the security engine 112 may, upon detecting an unauthorized attempt to access the app data 412, move the app data 412 to storage managed by the secure storage solution 366 to prevent or stop tampering of the app data 412. The data for the applications 114, 116 may be moved from different storage locations based on implementation of security policies, such as those described below with reference to FIGS. 6 and 7. In some embodiments, although the app data 412, 414 may be shown outside of the secure operating environment 110, such data may receive protection from security services provided by the secure operating environment 110.

Security Capabilities Information

FIG. 5 shows information 500 about security capabilities of a secure operating environment and a host operating environment of a computing device according to some embodiments of the present invention. The security capabilities information 130 can include the information 500. The information 500 can be generated at another device and stored on a computing device, e.g., the computing device 100 of FIG. 1. Alternatively or additionally, the information 500 may be generated dynamically by the security engine 112 based on determination of security capabilities of a secure operating environment (e.g., the secure operating environment 110) and/or a host operating environment (e.g., the host operating environment 102). In some embodiments, the security engine 112 can update security capabilities in the information 500 upon identifying new security capabilities or upon determining a change in existing security capabilities. As explained above, the security engine 112 can use security capabilities information to determine the security services that meet the security needs of the application.

Although the information 500 is shown including the security capabilities arranged in one manner (e.g., type of security capabilities), the security capabilities may be organized in other manners that enable security capabilities to be determined for a secure operating environments and/or a host operating environment. In some embodiments, security capabilities may be organized in the information 500 in more or fewer categories to enable determination of security capabilities.

FIG. 5 shows an example of types of security capabilities 520 that can be identified in the information 500. In the example, the types of security capabilities 520 may include memory management 504, data protection 506, communication security 508, identity management 510, authentication 512, access control 514, and/or privilege escalation detection 516. The information 500 may indicate security capabilities of a secure operating environment 522 and/or security capabilities of a host operating environment 524 with respect to the different types of security capabilities 504-516.

The following are examples of the types of security capabilities indicated by the information 500. For the secure operating environment security capabilities 522, the memory management security capabilities 504 may include security services such as allocation/de-allocation of memory, memory isolation, scrubbing, fragmentation management, memory recovery, read/write, initialization, and rounding size/ceiling size management. For the host operating environment security capabilities 524, the memory management security capabilities 504 may include the access to a secure storage and a secure element.

For the secure operating environment security capabilities 522, the data protection security capabilities 506 may include data encryption (e.g., AES, 3DES, DES), hashing, random number generation, management functions (e.g., rollback/replay management or time-bound data management), and cryptographic codes. For the host operating environment security capabilities 524, the data protection security capabilities 506 may include availability of data encryption (e.g., AES) and keychain management.

For the secure operating environment, security capabilities 522, the communication security capabilities 508 may include SSL, TLS, and VPN. For the host operating environment security capabilities 524, the communication security capabilities 508 may include SSL.

For the secure operating environment security capabilities 522, the identity management security capabilities 510 may include login/password management and bank account management. For the host operating environment security capabilities 524, there may be no security capabilities in the identity management security capabilities 510 category.

For the secure operating environment security capabilities 522, the authentication security capabilities 512 may include authentication of communications and commerce, and local and remote authentication. For the host operating environment security capabilities 524, the authentication security capabilities 512 may include authentication of user access.

For the secure operating environment security capabilities 522, the access control security capabilities 514 may include advanced access control (e.g., fine grain access control). For the host operating environment security capabilities 524, there may be no security capabilities in the access control security capabilities 514 category.

For the secure operating environment security capabilities 522, the privilege escalation detection capabilities 516 may include jail-breaking detection and root detection. For the host operating environment security capabilities 524, there may be no security capabilities for the privilege escalation detection capabilities 516 category.

The security capabilities indicated in the example shown in FIG. 5 may include more or fewer security capabilities. The security capabilities may depend on many factors including availability of system and/or processing resources, and capabilities of the computing device.

Example of Security Policies for a Secure Operating Environment

Figure 6:
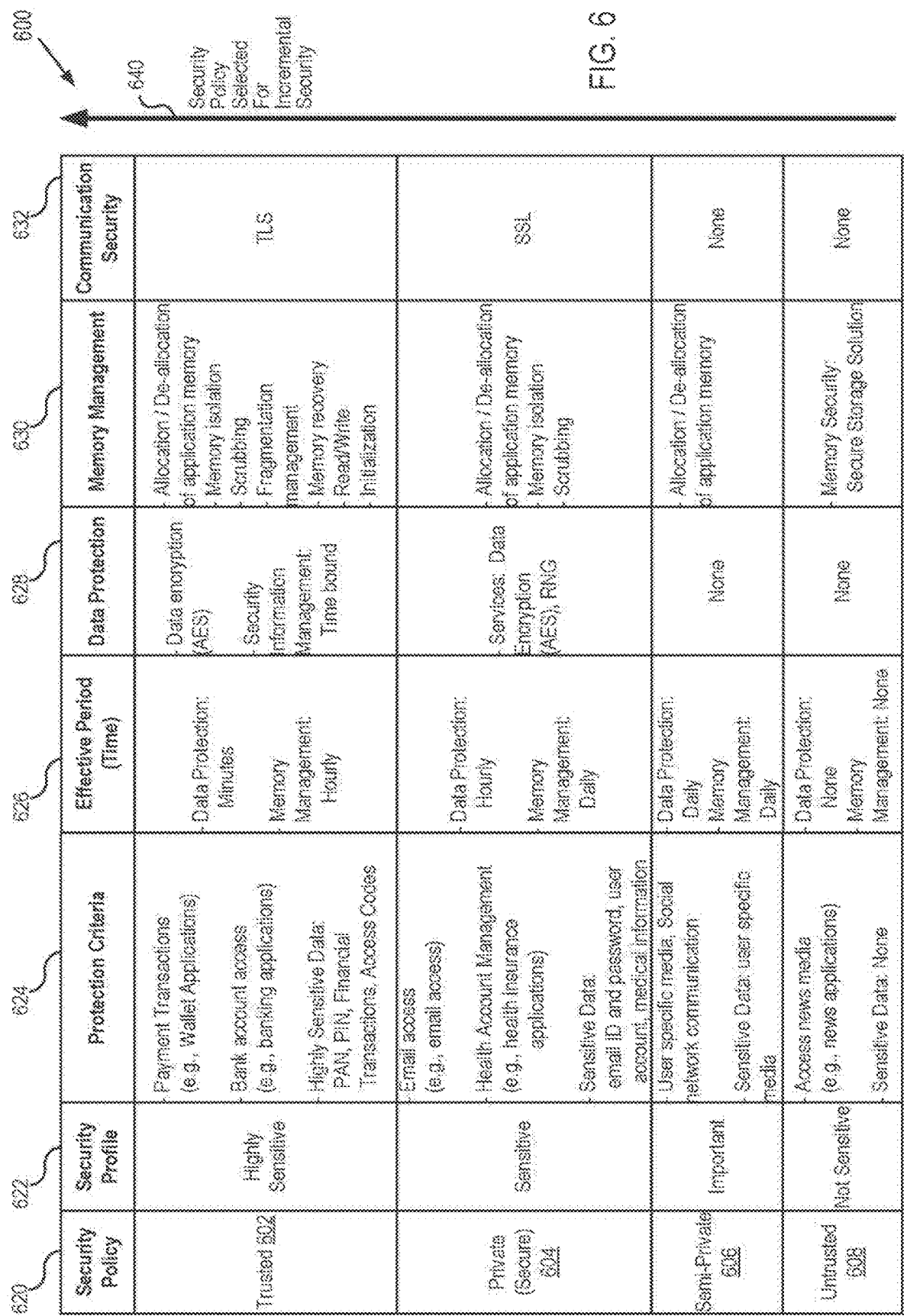
FIG. 6 shows information about security policies implemented for a secure operation environment according to some embodiments of the present invention.

FIG. 6 shows information 600 about security policies implemented for a secure operation environment according to some embodiments of the present invention. Specifically, the information 600 provides examples of different security policies that may be used by a secure operating environment (e.g., the secure operating environment 110). The information 600 may be included in the security policy information 138. The security policies indicated in the information 600 is not an exhaustive list and may include more or fewer security policies. In some embodiments, security policies may be added or modified based on availability of security capabilities.

In the example shown in FIG. 6, the information 600 may include different policies 620, such as a trusted security policy 602, a private (secure) security policy 604, a semi-private security policy 606, and an untrusted security policy 608. The security policies 602-608 may be used to manage security a secure operating environment. For example, the security policies 602-608 may be used to management security for applications executing in the secure operating environment 110. The information may indicate protection criteria 624 based on which the security policies 602-608 are implemented. The protection criteria 624 may be different or shared between the different security policies 602-608. The protection criteria 624 may be chosen based on a security profile 622. In some embodiments, the protection criteria 624 may be based applications, functions, operations, or data that are protected under a policy. The security profile 622 can be used to identify a classification or sensitivity (e.g., highly sensitive, sensitive, important, or not important) of operations performed by an application executing in the secure operating environment. The security profile may be based on a type of an application, a type of data processed by an application, contents of data, other criteria that may indicate level of sensitivity of the operations performed by an application, or a combination thereof. The secure operating environment may use these security policies to manage security for applications executing in the secure operating environment.

The security policies 602-608 may be used by the security engine 112 to determine security services to select for applications. For example, the secure operating environment 112 may chose a security policy to implement for an application based on the security profile that best fits the functions being performed for the application and/or the type of data processed for the application. In some embodiments, upon choosing a security policy to implement for an application, the secure operating environment 110 may choose security services based on the security capabilities selected by the security policy.

In some embodiments, a security policy may indicate an effective time period 626 when the security policy is to be implemented. For example, the security policy may indicate a time period, or a schedule for applying the security policy. The time period may correspond to specific security services provided by the secure operating environment. In some embodiments, the time period may be defined based on events that can occur with respect to the application. In some embodiments, the security policy may indicate criteria (e.g., events, states, or the like) based on which or all or a part of the security policy is to be applied.

The security policy may indicate specific security services and/or security capabilities to implement and the criteria under which to implement those services/capabilities. The security policy may indicate criteria (e.g., events) based on which the security policy is to be applied. For example, a security policy may indicate security services to perform, such as data protection 628, memory management 630, and/or communication security 632. The information 600 may include more or fewer type of security services provided for a security policy.

The policies 602-608 shown in FIG. 6 are examples of security policies to illustrate one way in which security policies may be implemented in a secure operating environment. For example, the trusted security policy 602 may correspond to a highly sensitive security profile. The trusted security profile 602 may be implemented based on protection criteria 624 including highly sensitive data and/or operations being performed by an application. For example, the trusted security policy 602 may be implemented for applications and functions such as payment transactions and bank account access that involve use and manipulation of highly sensitive data (e.g., a PAN, a PIN, financial transactions, and access codes).

The trusted security policy 602 may offer different effective periods for the different security services indicated by the trusted security policy 602. The data protection 628 corresponding to the security policy 602 may indicate the data protection services chosen and the policy for managing a secure storage solution. Under the chosen data protection services, implementation of storage for the secure storage solution 366 may be mutated on a time bound schedule. By mutating the secure storage solution 366, unauthorized entities may be prevented from determining the cryptographic techniques to gain access to the secure storage solution 366. The sensitive data may be mutated more frequently to prevent cryptographic techniques from being utilized to access the sensitive data.

Memory management 630 for the trusted policy 602 may indicate memory management services that are chosen for memory management in the secure operating environment. The effective period may indicate a schedule when the memory management services are performed under the trusted policy. The security policy 602 may indicate other criteria such as conditions, states, and/or events under which specific memory management functions are performed. The communication security 632 for the security policy 602 may indicate the communication security services that are utilized for the policy. The security policy 602 may indicate the criteria under which the communication security is performed.

In another example, the security policy 604 is a private (e.g., secure) security policy based on protection criteria for a sensitive security profile. The security policy 604 may be based on protection criteria 624 such as sensitive applications including email access and health account management. The sensitive data may include information like email account information and medical account information. The security policy 604 may indicate security services that provide similar type of protection for highly sensitive data and applications. However, the security policy 604 may indicate the data protection services 628, the memory management services 630 and the communication security 632 services for the security policy 604. Since the sensitivity is reduced for the security policy 604, the effective time periods for the security services may be different. Although not shown, the security policy 604 may indicate other criteria for performing the security services identified in the security policy 604.

The information 600 may include other security policies, such as a semi-private security policy 606 for important data and applications and an untrusted policy 608 for applications and data that may not be sensitive. The security policies 606, 608 may indicate an effective time period to perform the security services, such as data protection 628, memory management 630, and communication security 632. In some cases, for example, data protection and communication security may not be provided as these services may not be necessary based on the protection criteria 624 corresponding to the security policy.

The example security policies 602-608 shown in the information 600 illustrates an incremental change 640 in a security corresponding to the change in security profile. Security in a secure operating environment can be adjusted to utilize security services corresponding to a security profile. The security services can be chosen from security capabilities available in the secure operating environment and/or a host operating environment.

Example of Security Policies for a Secure Operating Environment

FIG. 7 shows information 700 about security policies implemented for a secure operation environment according to some embodiments of the present invention. Specifically, FIG. 7 shows the information 700 provides examples of different security policies that may be used by a secure operating environment (e.g., the secure operating environment 110). The information 700 may be included in the security policy information 138. The security policies indicated in the information 600 is not an exhaustive list and may include more or fewer security policies in some embodiments, security policies may be added or modified based on availability of security capabilities.

The examples shown in FIG. 7 identify other types of criteria, such as security information management, which can be used by the secure operating environment for managing a secure storage solution (e.g., the secure storage solution 366). The security policies 702-708 are examples of a security policies that can be defined for protection criteria 724 corresponding to a security profile 722. Similar to the security policies 602-608, the security policies 702-708 may indicate security services that may be performed for the security policies. FIG. 7 shows an incremental change 740 in security corresponding to a change in security profile selected for managing security in a secure operating environment.

The security policies 702-708 may be also used to manage security information for applications executing in a secure operating environment. The security policies 702-708 may include criteria such as security information management 728. The security information management 728 may indicate conditions by which the secure storage solution is to be modified (e.g., mutated). For example, for a highly sensitive security profile 722, the security information management 728 may indicate conditions such access and change. In the event that an unauthorized attempt to access (e.g., privilege escalation) the secure storage solution has occurred, the security operating environment may revoke the security information in the secure storage solution and mutate the secure storage solution to prevent the security information from being compromised. In the event that the secure storage solution has been accessed with proper authorization, the secure operating environment may mutate the secure storage solution to ensure that secure storage solution changes to prevent future intruders from gaining access to the secure storage solution. The secure operating environment may, as a default scheduled process according to the security policy 702, mutate the secure storage solution on a periodic schedule according to the effective time period 726 to ensure that unauthorized users may not gain access to the secure storage solution.

The other security policies 704-708 may include criteria for managing a secure storage solution and the security information according to sensitivity corresponding to the security profile 722. The security information management 728 for other security policies may indicate a different schedule or different actions with respect to the secure storage solution based on sensitivity of security information managed for a policy.

Having described implementation of a secure operating environment that can assess security capabilities of the computing device and/or provide security services, some embodiments of processes performed by a secure operating environment are described below with reference to FIGS. 8-11.

Individual embodiments described as a process may be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Example: Determine Security Capabilities to Provide a Security Service

Figure 8:
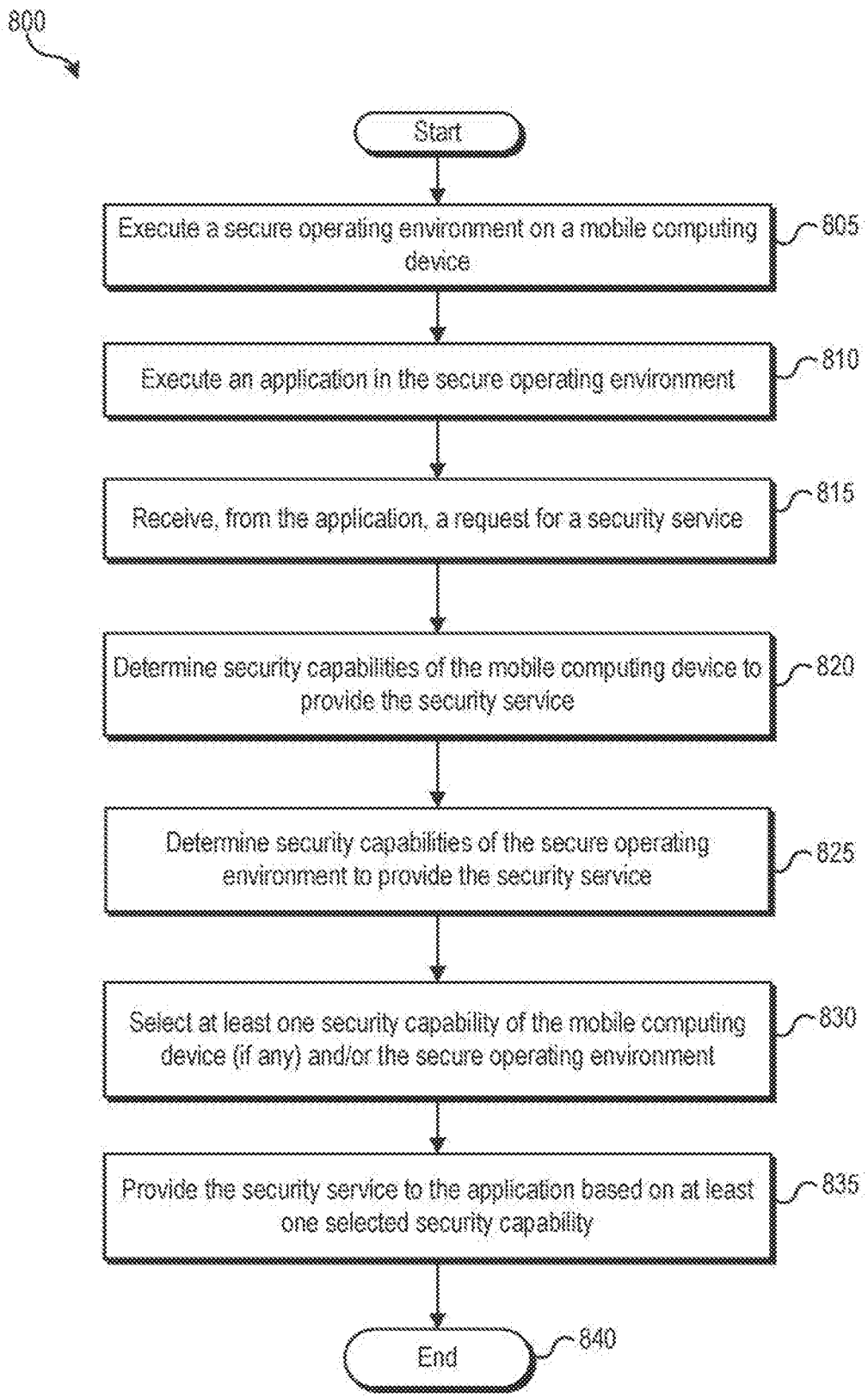
FIG. 8 shows a flow diagram of a process for providing a security service to an application executing in a secure operating environment according to some embodiments of the present invention.

FIG. 8 shows a flow diagram of a process 800 for providing a security service to an application executing in a secure operating environment according to some embodiments of the present invention. For example, the process 800 may determine a security service to provide to an application (e.g., the application 114) executing in the secure operating environment 110. The process 800 may determine security capabilities of a secure operating environment and security capabilities of a computing device, and then use the determined security capabilities to further determine a security service to provide to an application.

Starting at block 805, the process 800 may execute a secure operating environment on a computing device (e.g., a mobile computing device). For example, processor(s) of the computing device 110 may execute the secure operating environment 110.

At block 810, the process 800 may include the secure operating environment executing an application (e.g., a payment application). Prior to executing an application in the secure operating environment, a security engine (e.g., the secure engine 112) of the secure operating environment may perform one or more security services designed to implement an execution environment to enable execution of the application. The security services may include those described with reference to FIGS. 3 and 5. The security engine may allocated memory for the application using a secure storage solution (e.g., the secure storage solution 366) of the secure operating environment. The security engine may determine security capabilities on the computing device to determine a manner and mode for running the application. Based on the type of application, the security engine may implement security for the application. Security may be implemented based on security policies defined by security policy information. The security policy may be used to determine criteria for enabling an application to execute in the secure operating environment. In some embodiments, the security policy may indicate services and/or capabilities to enable prior to execution of the application.

Upon executing the application, at block 815, the process 800 may receive, from the application, a request for a security service. The request may be received by the secure operating environment. For example, the security engine 112 of the secure operating environment 110 may received the request 122 for a security service to be provided to the application 114. To provide the security service, the secure operating environment 110 may determine security capabilities, those available in the secure operating environment and those available in the computing device.

At block 820, the process 800 may include the secure operating environment determining security capabilities of the computing device to provide the security service. For example, the security engine 112 may determine the security capabilities of the computing device 100. In some instances, the computing device may not provide security capabilities that can provide the security service requested. In such cases, the process 800 may determine that the computing device does not have security capabilities to provide the security service. The secure operating environment may store information, such as the security capabilities information 130, which indicates the security capabilities of the computing device. The information about the security capabilities may indicate categories or types of security capabilities corresponding to security capabilities offered by the computing device (e.g., the security capabilities information 500). the information about the security capabilities may have been previously obtained from the host operating environment 102.

In some embodiments, the secure operating environment may dynamically determine the security capabilities of the comporting device to provide the security service. Because the security capabilities of the computing device may change, the secure operating environment may determine the security capabilities when needed, such as when a security service is requested. In one example, the security capabilities of the computing device may change based on resources available in a host operating environment (e.g., the host operating environment 102) of the computing device. The secure operating environment may determine security capabilities of the computing device by sending one or more requests (e.g., the request 126) to the host operating environment to determine the security capabilities that are available from the host operating environment 102. In some embodiments, the request 126 may include one or more operations, commands, or the like intended to determine security capabilities of the host operating environment to provide the security service requested by the application.

At block 825, the process 800 may include the secure operating environment determining the security capabilities of the secure operating environment to provide the security service requested by the application. As explained earlier, the secure operating environment may include a security engine that may store information about security capabilities (e.g., the security capabilities information 500) of the secure operating environment. In some embodiments, the security engine 112 of the secure operating environment 110 may access the security capability information to determine types of security capabilities provided by the secure operating environment. Based on the types of security capabilities, the security engine 112 may determine whether any of the security capabilities may provide the security service.

At block 830, the process 800 can select at least one security capability to provide the security service requested by the application. The security capability may be selected from the security capabilities of the computing device and/or the security capabilities of the secure operating environment. Upon determining that the computing doesn't provide a security capability to provide the service, the process 800 may select a security capability provided by the secure operating environment. In some embodiments, the secure operating environment may select one more security capabilities provided by both the secure operating environment and the host operating environment.

An example will now be discussed that described how the security capability may be selected based on security capabilities that have been determine. For example, a payment application executing in the secure operating environment may request data protection as a security service for the application. To secure sensitive data, such as identification or payment information, the payment application may desire to perform cryptographic operations and to store the sensitive data in a secure location in memory of the computing device. The security engine of the secure operating environment may compare the security capabilities of the computing device to the security capabilities of the secure operating environment. In one exemplary comparison, the secure operating environment may determine that the secure operating environment provides cryptographic services supporting a stronger encryption methodology not available from the computing device.

In some instances, the secure operating environment may provide other security capabilities in addition to those available from the computing device. For example, the secure operating environment may provide other data protection services such as a secure storage solution 366 for storing the sensitive data in a more secure location and/or modifying storage of the sensitive data periodically so as to prevent access to the data. In the example just described, the secure operating environment may choose the security capabilities of the secure operating environment because they provide greater protection for the sensitive data. In some embodiments, the secure capabilities of the host operating environment may be chosen where the host operating environment provides comparable, if not better, security capabilities. In some embodiments, the secure operating environment may choose security capabilities from both the secure operating environment and the host operating environment. Selecting security capabilities from both environments can maximize processing and/or system resources of both environments.

At block 835, the process 800 can provide the security request to the application based on at least one security capability that is selected. Providing the security capability can include enabling a security capability that can be used by the application. Providing the security capability can include performing the security service for the application based on the chosen security capabilities. The process 800 ends at block 840.

Blocks 805-835 can be performed in an iterative manner for each secure operating environment executed on a computing device. Alternatively or additionally, blocks 815-835 can be performed in an iterative manner for each request for a security service in a secure operating environment. It will be appreciated that process 800 is illustrative and that variations and modifications are possible. Action or operations described for process 800 as sequential may be executed in parallel and/or order of operations may be varied, and operations may be modified, combined, added or omitted.

Example: Determining a Security Policy to Manage Security of Memory

Figure 9:
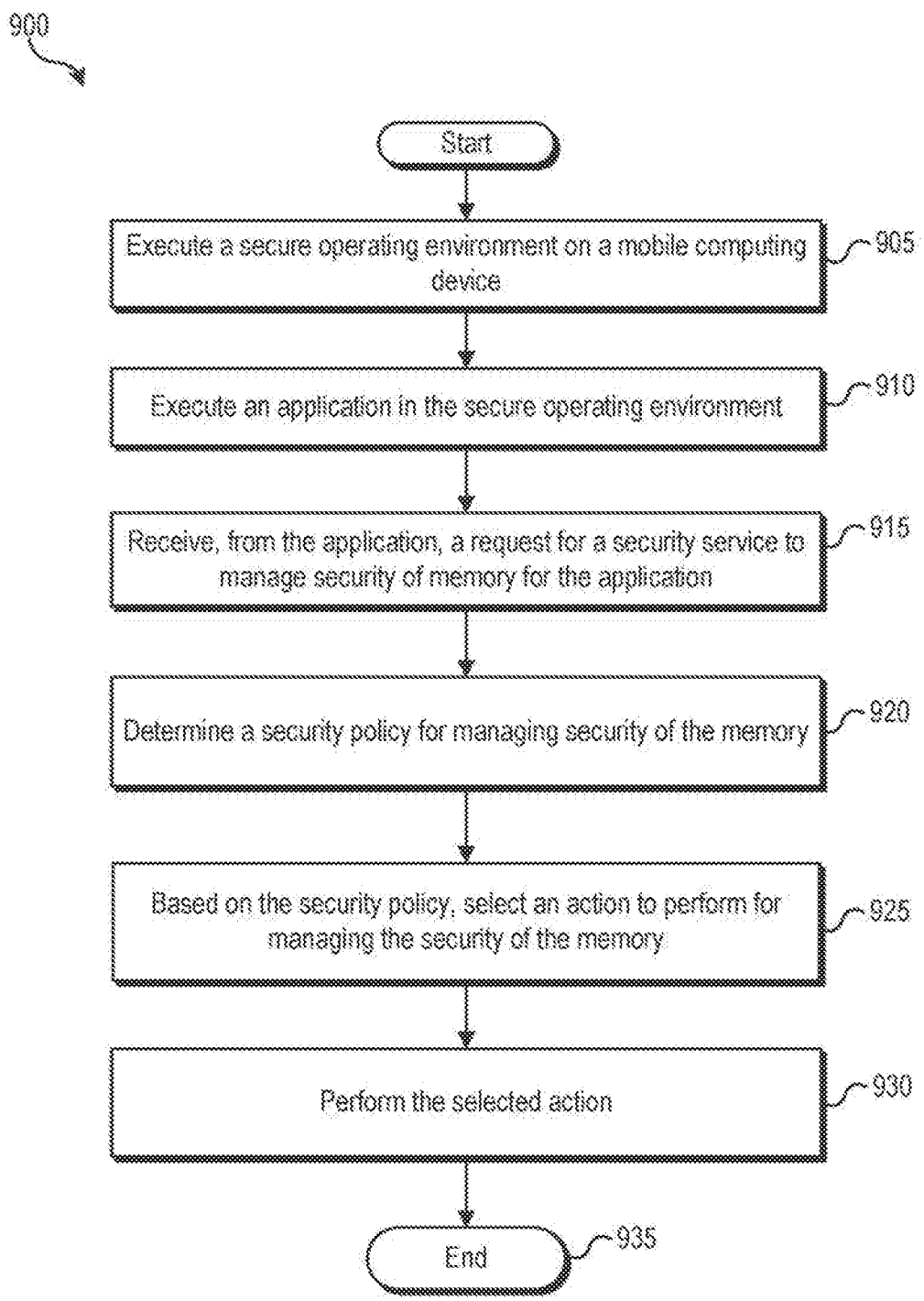
FIG. 9 shows a flow diagram of a process for implementing a security policy in a secure operating environment according to some embodiments of the present invention.

Now turning to FIG. 9, a flow diagram of a process 900 is shown for implementing a security policy in a secure operating environment according to some embodiments of the present invention. In one example, the process 900 may determine a security policy for managing security of memory for an application (e.g., the application 114) executing in a secure operating environment. The process 900 may then use the security policy to identify and select an action to perform for managing security of the memory.

Starting at block 905, the process 900 may execute a secure operating environment on a computing device (e.g., a mobile computing device). At block 910, the process 900 may include the secure operating environment executing an application.

Upon executing the application, at block 915, the process 900 may receive, from the application, a request for a security service to manage security of memory for the application. The request may be received by the secure operating environment. For example, the security engine 112 may receive the request 122 for a security service to manage security of memory for the application 114. The request may indicate a type of the application and/or a type of operating being performed for which security of memory is to be managed. In the instance in which the application is related to payment processing, the request 122 may be communicated for data protection related to information (e.g., personal identification information) stored for processing payments.

At block 920, the process 900 may determine a security policy for managing security of the memory. For example, the secure operating environment 110 may consult the security policy information (e.g., the security policy information 600 or the security policy information 700) to determine a security policy for managing security of the memory for the application. Based on the request, the secure operating environment may determine a type of the application and/or the type of information to be protected in the memory for the application. Returning to the example of a payment application, the secure operating environment may use security policy information (e.g., the security policy information 700) to determine that a trusted security policy (e.g., the trusted security policy 702) may be suited for managing security of memory for storing highly sensitive information (e.g., financial account information and personal identification information).

At block 925, the process 900 may select, based on the security policy, one or more actions to perform for managing security of the memory for the application. The security policy (e.g., the trusted security policy 702) may indicate security services to be performed and/or enabled for implementing the security policy. The security policy may indicate actions to be performed using those security services. For example, in FIG. 7, the trusted policy 702 may indicate actions such as allocating and de-allocating memory, scrubbing, and fragmentation management as actions to be performed for managing security of storage. One or more of these actions may be selected. In some embodiments, an action may be selected based on a specific type of sensitive data that is being stored. Although not shown, the trusted policy may indicate specific actions to be performed for certain types of data.

At block 930, the process 900 performs the action selected from the security policy. As explained above, multiple actions may be selected for a security policy. The process 900 ends at block 935.

Blocks 905-930 can be performed in an iterative manner for each secure operating environment executed on a computing device. Alternatively or additionally, blocks 915-930 can be performed in an iterative manner for each request for a security service to manage security of memory for an application executing in a secure operating environment. It will be appreciated that process 900 is illustrative and that variations and modifications are possible. Action or operations described for process 900 as sequential may be executed in parallel and/or order of operations may be varied, and operations may be modified, combined, added or omitted.

Example: Using a Security Policy to Manage Storage of Security Information

Figure 10:
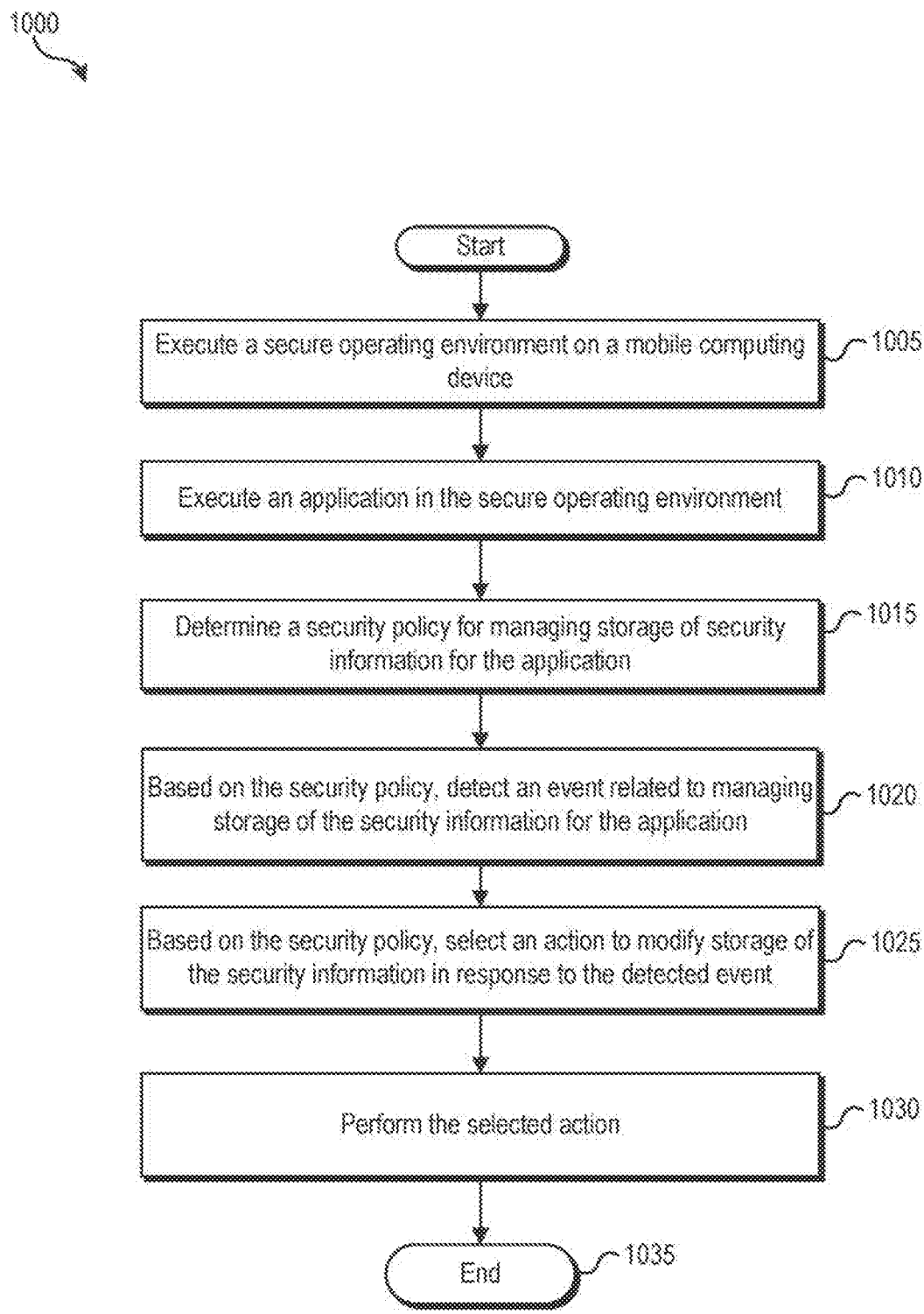
FIG. 10 shows a flow diagram of a process for implementing a security policy in a secure operating environment according to some embodiments of the present invention.

Now turning to FIG. 10, a flow diagram of a process 1000 is shown for implementing a security policy in a secure operating environment according to some embodiments of the present invention. In one example, the process 1000 may determine a security policy for managing storage of security information for an application executing in the secure operating environment 110. The process 1000 may then use the security policy to manage storage of security information based on criteria indicated by the security policy.

Starting at block 1005, the process 1000 may execute a secure operating environment on a computing device (e.g., a mobile computing device). At block 1010, the process 1000 may include the secure operating environment executing an application.

At block 1015, the process 1000 may determine a security policy for managing storage of security information (e.g., a secure storage solution) for the application executing in the secure operating environment. The security policy (e.g., the trusted security policy 702) may indicate security services to manage storage of the security information. A security policy (e.g., the trusted security policy 702) may indicate the security services that can be performed to manage the security information. In some embodiments, the security services to manage storage for the security information may be performed by the security information manager 364.

At block 1020, the process 1000 may use the security policy to detect an event related to managing storage of the security information for the application. For example, the security policy may indicate an event (e.g., a time period) for modifying or mutating properties of storage of security information. In this example, the security information manager 364 may detect the occurrence of the time period according to the security policy.

At block 1025, the process 1000 may use the security policy to select an action to perform. Continuing from the previous example, the security policy may be useful to indicate actions (e.g., actions to change properties) to perform on the storage upon detecting the event. In some embodiments, the security information manager 364 may mutate the storage to change its properties in response to the event.

At block 1030, the process 1000 may perform the selected action. In some embodiments, the selected action may be performed by the computing device, e.g., the operating system, the firmware, or the hardware.

Blocks 1005-1030 can be performed in an iterative manner for each secure operating environment executed on a computing device. Alternatively or additionally, blocks 1015-1030 can be performed in an iterative manner to determine and apply a security policy for each application executing in the secure environment. Alternatively or additionally, blocks 1020-1030 can be performed in an iterative manner for each event that is detected relating to managing storage of the security information for the application. It will be appreciated that process 1000 is illustrative and that variations and modifications are possible. Action or operations described for process 1000 as sequential may be executed in parallel and/or order of operations may be varied, and operations may be modified, combined, added or omitted.

Example: Using a Security Policy to Mange Memory for an Application

Figure 11:
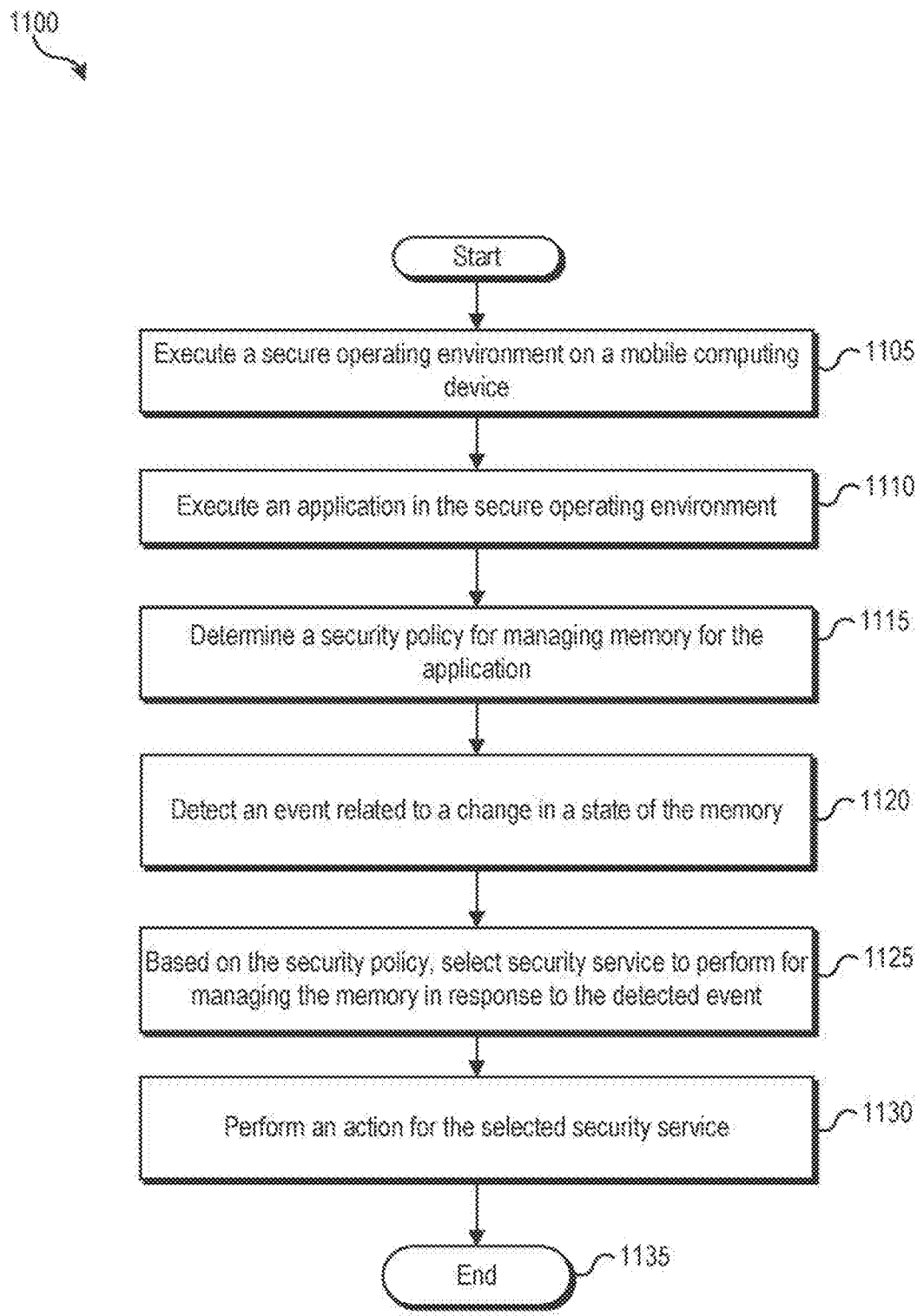
FIG. 11 shows a flow diagram of a process for implementing a security policy in a secure operating environment according to some embodiments of the present invention.

Now turning to FIG. 11, a flow diagram of a process 1100 is shown for implementing a security policy in a secure operating environment according to some embodiments of the present invention. In another example, the process 1000 may determine a security policy for managing memory for an application (e.g., the application 114) executing in the secure operating environment 110. The process 1100 may then use criteria indicated by the security policy to select an action to manage memory in response to detecting a change in a state of the memory.

Starting at block 1105, the process 1100 may execute a secure operating environment on a computing device (e.g., a mobile computing device). At block 1110, the process 1100 may include the secure operating environment executing an application.

At block 1115, the process 1100 may determine a security policy for managing memory for the application executing in the secure operating environment. The security policy may indicate site security services to provide for managing the memory, and the conditions upon which the security services are to be provided.

At block 1120, the process 1100 may detect an event related to a change in state of the memory allocated for the application. For example, the security engine 112 may use memory management services 340 to detect a change in state of storage managed by the secure storage solution 366. A change in the state of the storage may be indicative of an attempt to tamper or access the memory. To provide a secure environment and protect sensitive data, the memory management services 340 may detect the change in state in order to identify an attempt to access or modify storage of sensitive data for the application.

At block 1125, the process 1100 may use the security policy to select an action to perform in response to the detected event. The security policy may indicate actions for a security service to provide for managing memory for an application. For example, a security policy (e.g., the security policy 702) may indicate actions, such as modifying the memory according to memory management actions to prevent a potential unauthorized access to the memory. In particular, the security policy (e.g., the security policy 702) may indicate criteria (e.g., different states or conditions) when the security service and corresponding actions should be performed.

At block 1130, the process 1100 may perform the action selected for the security service. As explained above, a security service determined from a security policy may include one or more actions. The process 1100 ends at block 1135.

Blocks 1105-1130 can be performed in an iterative manner for each secure operating environment executed on a computing device. Alternatively or additionally, blocks 1115-1030 can be performed in an iterative manner to determine and apply a security policy for each application executing in the secure environment. Alternatively or additionally, blocks 1120-1030 can be performed in an iterative manner for each event that is detected relating a change in a state of memory allocated for the application. It will be appreciated that process 1100 is illustrative and that variations and modifications are possible. Action or operations described for process 1100 as sequential may be executed in parallel and/or order of operations may be varied, and operations may be modified, combined, added or omitted.

Figure 12:
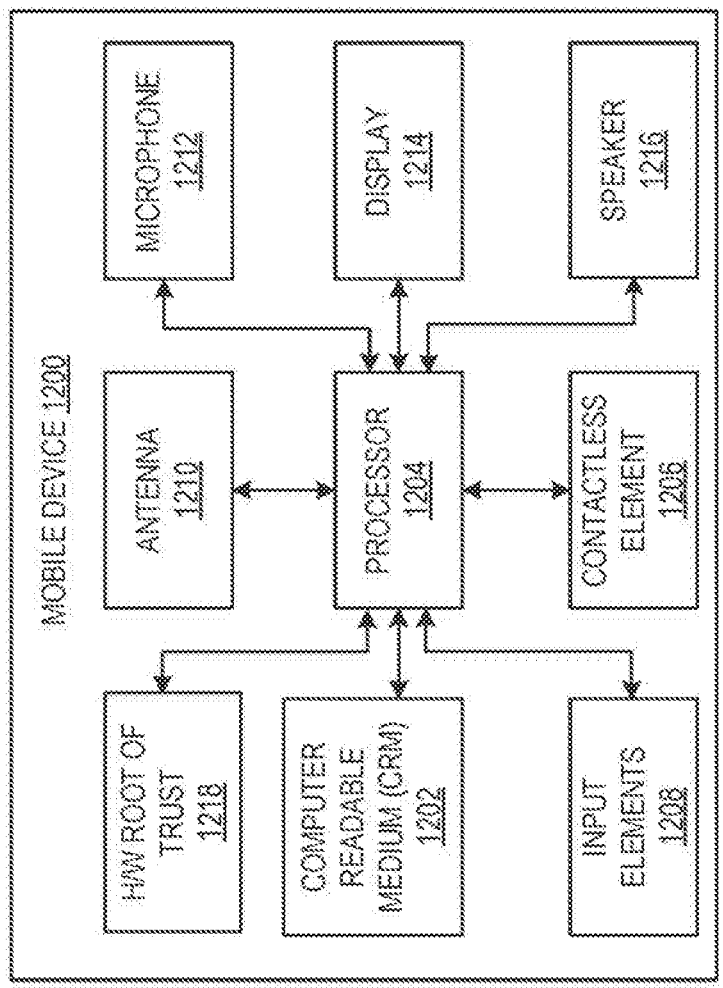
FIG. 12 shows a block diagram of a mobile device in accordance with some embodiments of the present invention.

FIG. 12 illustrates at least some of the elements of an exemplary mobile device 1200 in accordance with some embodiments. Mobile device 1200 may be a mobile phone, a tablet, a PDA, a laptop or any such electronic device capable of communicating and transferring data or control instructions via a wireless network (e.g., cellular network, internet, etc.) and short range communications. Mobile device 1200 may include the processor 1204 (e.g., a microprocessor) for processing the functions of mobile device 1200 (e.g., a phone) and a display 1214 to allow a user to see messages (e.g., alert messages), phone numbers, images, and other information. Mobile device 1200 may further include input elements 1208 to allow the user to input information into the device (e.g., using a keypad, touch screen, mouse, etc.), a speaker 1216 to allow the user hear voice communication, music, etc., and a microphone 1212 to allow the user transmit voice through the device. Mobile device 1200 may also include an antenna 1202 for wireless data transfer.

In some embodiments, mobile device 1200 may allow the user to communicate with one or more entities, such as the entities described in FIG. 1. Mobile device 1200 may act as a payment device that may be used to make payments, conduct a transaction, a communication device to allow a user to log on to a website and download an application, etc. Mobile device 1200 may also allow the user to download and install security sensitive applications on the mobile device 1200. The exemplary mobile device 1200 may comprise a computer readable medium (CRM) 1202 comprising code executable by the processor 1204 for implementing methods and processes using embodiments of the invention. The computer readable medium 1202 may be in the form of a memory that stores data and could be internal to the device or hosted remotely (i.e., cloud) and accessed wirelessly by the device. A contactless element 1206 may be capable of transmitting and receiving wireless data or instructions using a short range wireless communications capability.

Figure 13:
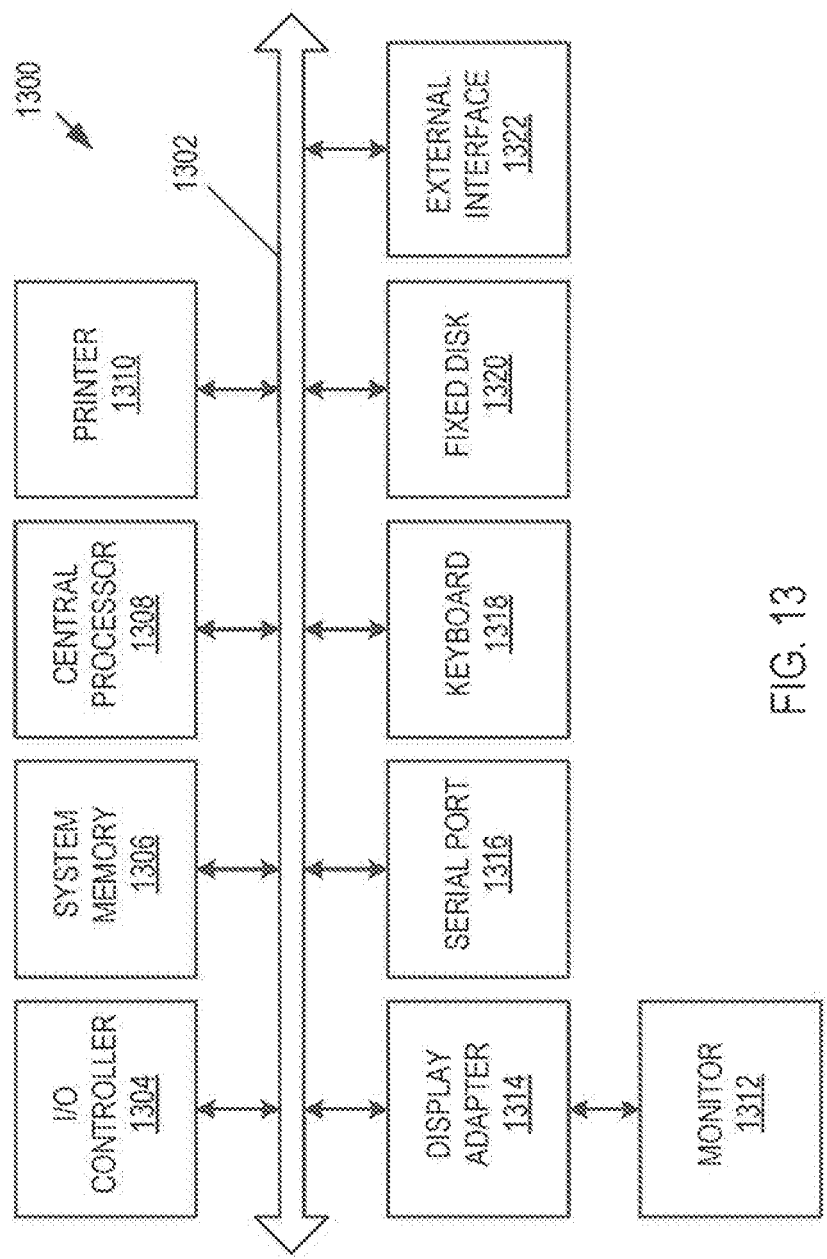
FIG. 13 shows a block diagram of a computing device in accordance with some embodiments of the present invention.

FIG. 13 is a high level block diagram of a computer system that may be used to implement any of the entities or components described herein. The subsystems shown in FIG. 13 are interconnected via a system bus 1302. Additional subsystems may include a printer 1310, keyboard 1318, fixed disk 1320, and monitor 1312, which is coupled to display adapter 1314. Peripherals and input/output (I/O) devices, which couple to I/O controller 1304, can be connected to the computer system by any number of means known in the art, such as a serial port. For example, serial port 1316 or external interface 1322 can be used to connect the computer apparatus to a wide area network such as the Internet, a mouse input device, or a scanner. The interconnection via system bus 1302 allows the central processor 1308 to communicate with each subsystem and to control the execution of instructions from system memory 1306 or the fixed disk 1320, as well as the exchange of information between subsystems. The system memory 1306 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as a compact disk (CD) or digital versatile disk (DVD), flash memory, memory or memory devices. A computer-program product may include code and/or machine-executable instructions that may represent a procedure, a function, a subprogram, a program, a routine, a subroutine, module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments re merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   executing, by a mobile computing device, a secure operating environment on the mobile computing device, wherein the secure operating environment executes on the mobile computing device independently of a host operating environment of the mobile computing device, and wherein the secure operating environment includes a security services engine comprising one or more of the following types of security services: memory management services, data protection services, policy services, access control services, authentication services, privilege escalation detection services, identity management services, or secure connection services;
   receiving, by the secure operating environment, a request for a security service, the request received from an application executing in the secure operating environment, the request indicating a type of security service to perform for the application;
   determining, by the secure operating environment, a security capability of the mobile computing device to provide the security service, wherein the security capability of the mobile computing device is provided in part by the host operating environment;
   selecting, by the security services engine of the secure operating environment based on the security capability of the mobile computing device and the type of security service, a first security capability to provide the security service, wherein the first security capability is selected from one or both of the security capability of the mobile computing device or a security capability of the secure operating environment; and
   providing, by the secure operating environment, the security service to the application, wherein the security service is provided based on the first security capability.

2. The method of claim 1, wherein the security capability of the mobile computing device provided in part by the host operating environment includes one or both of a security capability of a host operating system of the mobile computing device or a security capability of hardware in the mobile computing device.

3. The method of claim 1, further comprising:
   prior to selecting the first security capability, determining whether a privilege escalation has occurred on the mobile computing device; and
   wherein the security capability of the mobile computing device is not selected as the first security capability upon determining that the privilege escalation has occurred on the mobile computing device.

4. The method of claim 3, wherein the privilege escalation occurred by jail-breaking or rooting of the mobile computing device.

5. The method of claim 1, further comprising:
   determining whether the security capability of the mobile computing device provided in part by the host operating environment is not capable to provide the security service;
   wherein the first security capability is selected from the security capability of the secure operating environment upon determining that the security capability of the mobile computing device provided in part by the host operating environment is not capable to provide the security service.

6. The method of claim 1, wherein the mobile computing device includes a memory device used by the secure operating environment to execute the application, and wherein the security service includes a scrubbing service to scrub the memory device used to execute the application.

7. The method of claim 1, wherein the security service includes a memory management service, wherein the memory management service performs operations to manage fragmentation of memory used for the application, and wherein the fragmentation of the memory is managed to prevent unauthorized access to security information stored in the memory for the application.

8. The method of claim 1, further comprising:
determining whether the security capability of the mobile computing device includes a capability for receiving input via a trusted security mechanism; and
wherein the first security capability is selected from the security capability of the secure operating environment upon determining that the security capability of the mobile computing device does not include the capability for receiving input via the trusted security mechanism.

9. The method of claim 1, wherein the mobile computing device includes a first memory device used by the secure operating environment to execute the application, and wherein the mobile computing device includes a second memory device used by the mobile computing device to operate the host operating environment, and wherein the first memory device is different from the second memory device.

10. A mobile communication device comprising:
one or more processors;
one or more first memory devices coupled to the one or more processors, the one or more first memory devices configured to be used by the one or more processors to execute a secure operating environment, the secure operating environment including a security services engine comprising one or more of the following types of security services: memory management services, data protection services, policy services, access control services, authentication services, privilege escalation detection services, identity management services, or secure connection services; and
one or more second memory devices coupled to the one or more processors, the one or more second memory devices including instructions which when executed on the one or more processors, cause the one or more processors to:
execute a host operating environment; and
execute the secure operating environment, wherein upon execution of the secure operating environment, the secure operating environment performs a method comprising:
executing an application in the secure operating environment;
receiving, from the application, a request for a security service, the request indicating a type of security service to perform for the application;
determining a security capability of the mobile communication device to provide the security service, wherein the security capability of the mobile communication device is provided in part by the host operating environment;
selecting, based on the security capability of the mobile communication device and the type of security service, a first security capability to provide the security service, wherein the first security capability is selected from one or both of the security capability of the mobile communication device and a security capability of the secure operating environment; and
providing, to the application, the security service based on the first security capability.

11. The mobile communication device of claim 10, wherein the security capability provided by the host operating environment includes a security capability provided by hardware of the mobile communication device, and wherein the hardware includes the one or more processors, the one or more first memory devices, and the one or more second memory devices.

12. The mobile communication device of claim 10, wherein the instructions, when executed on the one or more processors, further cause the one or more processors to:
determine whether the security capability of the mobile communication device provided in part by the host operating environment is not capable to provide the security service;
wherein the first security capability is selected from the security capability of the secure operating environment upon determining that the security capability of the mobile communication device provided in part by the host operating environment is not capable to provide the security service.

13. The mobile communication device of claim 10, wherein the method further comprises:
prior to selecting the first security capability, determining whether a privilege escalation has occurred on the mobile communication device; and
wherein the security capability of the mobile communication device is not selected as the first security capability upon determining that the privilege escalation has occurred on the mobile communication device.

14. A method comprising:
executing a secure operating environment, wherein the secure operating environment executes independently of a host operating environment of a mobile computing device, and wherein the secure operating environment includes a security services engine comprising one or more of the following types of security services: memory management services, data protection services, policy services, access control services, authentication services, privilege escalation detection services, identity management services, or secure connection services;
receiving, by the secure operating environment, a request for a security service, the request received from an application executing in the secure operating environment, the request indicating a type of security service to perform for the application;
determining, by the secure operating environment, a security capability of the mobile computing device to provide the security service, wherein the security capability of the mobile computing device is provided in part by the host operating environment;
determining, by the secure operating environment, a security capability of the secure operating environment to provide the security service;
performing a comparison between the security capability of the mobile computing device and the security capability of the secure operating environment;
selecting, by the security services engine of the secure operating environment, based on the comparison and the type of security service, a first security capability to provide the security service, wherein the first security capability is selected from one or both of the security capability of the mobile computing device or the security capability of the secure operating environment; and
providing, by the secure operating environment, the security service to the application, wherein the security service is provided based on the first security capability.

15. The method of claim 14, wherein the security capability of the mobile computing device provided in part by the host operating environment includes one or both of a security capability of a host operating system of the mobile computing device or a security capability of hardware in the mobile computing device.

16. The method of claim 14, further comprising:
prior to selecting the first security capability, determining whether a privilege escalation has occurred on the mobile computing device; and
wherein the security capability of the mobile computing device is not selected as the first security capability upon determining that the privilege escalation has occurred on the mobile computing device.

17. The method of claim 16, wherein the privilege escalation occurred by jail-breaking or rooting of the mobile computing device.

18. The method of claim 14, further comprising:
determining whether the security capability of the mobile computing device provided in part by the host operating environment is not capable to provide the security service;
wherein the first security capability is selected from the security capability of the secure operating environment upon determining that the security capability of the mobile computing device provided in part by the host operating environment is not capable to provide the security service.

19. The method of claim 14, further comprising:
determining whether the security capability of the mobile computing device includes a capability for receiving input via a trusted security mechanism; and
wherein the first security capability is selected from the security capability of the secure operating environment upon determining that the security capability of the mobile computing device does not include the capability for receiving input via the trusted security mechanism.

* * * * *